United States Patent [19]
Zahora et al.

[11] Patent Number: 6,085,010
[45] Date of Patent: Jul. 4, 2000

[54] OPTICAL GLASS FIBER RIBBON ASSEMBLIES AND RADIATION-CURABLE COMPOSITIONS FOR USE IN FORMING RIBBON ASSEMBLIES

[75] Inventors: Edward P. Zahora, Naperville; Edward J. Murphy, Arlington Heights; David M. Szum, Elmhurst; John T. Vandeberg, Barrington; Gerry K. Noren, Algonquin; Eva Montgomery, Woodstock, all of Ill.

[73] Assignee: DSM N.V., Heerlen, Netherlands

[21] Appl. No.: 09/129,234

[22] Filed: Aug. 5, 1998

Related U.S. Application Data

[63] Continuation-in-part of application No. 09/094,497, Jun. 10, 1998, abandoned.

[60] Provisional application No. 60/049,064, Jun. 11, 1997.

[51] Int. Cl.$^7$ ...................................... G02B 6/44
[52] U.S. Cl. .......................... 385/114; 385/106; 385/128; 428/383; 428/375
[58] Field of Search ........................... 385/100–114, 147, 385/128; 428/375, 383; 522/13, 16, 14; 521/113; 427/500, 503, 514, 515, 517

[56] References Cited

U.S. PATENT DOCUMENTS

| | | |
|---|---|---|
| 4,624,994 | 11/1986 | Ansel . |
| 4,629,285 | 12/1986 | Carter . |
| 4,682,851 | 7/1987 | Ansel . |
| 4,782,129 | 11/1988 | Moschovis . |
| 4,794,133 | 12/1988 | Moschovis . |
| 4,806,574 | 2/1989 | Krajewski . |
| 4,844,604 | 7/1989 | Bishop . |
| 4,900,126 | 2/1990 | Jackson . |
| 4,953,945 | 9/1990 | Nishimura . |
| 5,011,260 | 4/1991 | Marx . |
| 5,146,531 | 9/1992 | Schustack . |
| 5,259,060 | 11/1993 | Edward . |
| 5,373,578 | 12/1994 | Parker . |
| 5,377,292 | 12/1994 | Bartling . |
| 5,416,880 | 5/1995 | Edwards . |
| 5,524,164 | 6/1996 | Hattori et al. ........................ 385/114 |
| 5,539,849 | 7/1996 | Petisce . |
| 5,561,730 | 10/1996 | Lochkovic . |
| 5,621,838 | 4/1997 | Nomura . |
| 5,906,067 | 3/1990 | Mayr . |

FOREIGN PATENT DOCUMENTS

| | | |
|---|---|---|
| 0194891 A1 | 9/1986 | European Pat. Off. . |
| 0 345 968 A2 | 12/1989 | European Pat. Off. . |
| 0407004 A2 | 1/1991 | European Pat. Off. . |
| 0565798 A1 | 10/1992 | European Pat. Off. . |
| 0527266 A1 | 2/1993 | European Pat. Off. . |
| 0539030 B1 | 4/1993 | European Pat. Off. . |
| 0614099 A2 | 9/1994 | European Pat. Off. . |
| 0 699 933 A2 | 6/1996 | European Pat. Off. . |
| 0 753 777 A2 | 1/1997 | European Pat. Off. . |
| 0 780 712 A2 | 6/1997 | European Pat. Off. . |
| 0262340 A2 | 4/1998 | European Pat. Off. . |
| 2 672 699 | 8/1992 | France . |
| 4007 519 | 3/1990 | Germany . |
| 62-177159 | 1/1989 | Japan . |
| 01152114 | 6/1989 | Japan . |
| 62-311609 | 6/1989 | Japan . |
| 4057 814 | 6/1990 | Japan . |
| 3-35210 | 2/1991 | Japan . |
| 3067 208 | 6/1991 | Japan . |
| 04296315 | 10/1992 | Japan . |
| 242146 | 7/1995 | New Zealand . |
| WO 90/13579 | 11/1990 | WIPO . |
| WO 93/21248 A1 | 10/1993 | WIPO . |
| WO 96/02596 A1 | 2/1996 | WIPO . |
| WO 97/05515 | 2/1997 | WIPO . |
| WO 97/16469 | 5/1997 | WIPO . |
| WO 97/18493 | 5/1997 | WIPO . |
| WO 97/19029 | 5/1997 | WIPO . |

OTHER PUBLICATIONS

K.W. Jackson, et. al., "The Effect of Fiber Ribbon Component Materials on Mechanical and Environmental Performance", 28 International Wire & Symposium Proceedings (1993), Nov.

H.C. Chandon, et. al., "Fiber Protective Design for Evolving Telecommunication Applications", International Wire & Symposium Proceedings (1992), Nov.

J.R. Toler, et. al., "Factors Affecting Mechanical Stripping of Polymer Coatings From Optical Fibers", International Wire & Cable Symposium Proceedings (1989), Nov.

w. Griffioen, "Strippability of Optical Fibers", EFOC & N, Eleventh Annual conference, Hague (1993), Jul.

*Primary Examiner*—Phan T. H. Palmer
*Attorney, Agent, or Firm*—Jeffrey S. Melcher

[57] ABSTRACT

Provided is a ribbon assembly having the functional capability of providing mid-span access without the use of additives, monomers or oligomers containing fluorine or silicone. The ribbon assembly is formulated from an oligomer which reduces the surface energy of the ink coating and/or the matrix material.

52 Claims, No Drawings

OPTICAL GLASS FIBER RIBBON ASSEMBLIES AND RADIATION-CURABLE COMPOSITIONS FOR USE IN FORMING RIBBON ASSEMBLIES

This application is a continuation-in-part of regular U.S. patent application Ser. No. 09/094,497, filed on Jun. 10, 1998, now abandoned, and this application claims priority to Provisional Patent Application Ser. No. 60/049,064, filed on Jun. 11, 1997, the complete disclosures of which are incorporated herein by reference.

BACKGROUND OF THE INVENTION

1. Field of the Invention.

The invention relates to optical glass fiber ribbon assemblies. The present invention also relates to radiation-curable compositions suitable for use in forming the ribbon assemblies, such as radiation-curable matrix forming compositions, radiation-curable ink coating compositions and radiation-curable colored outer primary coating compositions.

2. Description of Related Art

Optical glass fibers are generally coated with two superposed radiation-cured coatings, which together form a primary coating. The coating which is in direct contact with the glass is called the inner primary coating and the overlaying coating(s) is called the outer primary coating.

The inner primary coating is usually a relatively soft coating providing environmental protection to the glass fiber and resistance, inter alia, to the well-known phenomenon of microbending. Microbending in the coated fiber can lead to attenuation of the signal transmission capability of the coated fiber and is therefore undesirable. The outer primary coating(s), which is on the exposed surface of the coated fiber, is typically a relatively harder coating designed to provide a desired resistance to physical handling forces, such as those encountered when the fiber is cabled.

For the purpose of multi-channel transmission, optical glass fiber assemblies containing a plurality of coated optical fibers have been used. Examples of optical glass fiber assemblies include ribbon assemblies and cables. A typical ribbon assembly is made by bonding together a plurality of parallel oriented, individually coated optical glass fibers with a matrix material. The matrix material has the function of holding the individual optical glass fibers in alignment and protecting the same during handling and the installation environment. Often, the fibers are arranged in "tape-like" ribbon structures, having a generally flat, strand like structure containing generally from about 2 to 24 fibers. Depending upon the application, a plurality of resulting ribbon assemblies can be combined into a cable which has from several up to about one thousand individually coated optical glass fibers. An example of a ribbon assembly is described in published European patent application No. 194891. In general, a plurality of ribbon assemblies may then be combined together in a cable, as disclosed in U.S. Pat. No. 4,906,067.

The term "ribbon assembly" as used herein includes the tape-like ribbon assembly described above, as well as optical glass fiber bundles. Optical glass fiber bundles can be, for example, a substantially circular array having at least one central fiber surrounded by a plurality of further optical glass fibers. Alternatively, the bundle may have other appropriate cross-sectional shapes such as square, trapezoid, etc.

Coated optical glass fibers for use in optical glass fiber assemblies are usually coated with an outer colored layer, called an ink coating, or alternatively a colorant is added to the outer primary coating to facilitate identification of the individual coated optical glass fibers. Thus, the matrix material which binds the coated optical glass fibers together contacts the outer ink layer if present, or the colored outer primary coating.

Ink coatings usually have a thickness of about 3 to about 10 microns and are formed from a pigment dispersed within a UV curable carrier system. The UV curable carrier system contains a UV curable oligomer or monomer that is liquid before curing to facilitate application of the ink composition to the optical glass fiber, and then a solid after being exposed to UV radiation. In this manner, the UV curable ink composition can be applied to a coated optical glass fiber in the same manner as the inner primary and outer primary coatings are applied.

It is commonly required that, in use, branching fiber connections must be made at a location intermediate to the respective termini of a given length of the ribbon assembly. Accessing the individual fibers in this manner is commonly referred to as "mid-span access" and presents special problems. Normal methods and tools for accessing the end or terminus of the ribbon assembly are generally not well adapted or are inoperable for providing midspan access.

There have been many attempts to provide a ribbon unit in which the matrix material is easily separated from the colored coating present on optical glass fibers at any location on the ribbon unit without removal of the colored coating from the coated optical glass fibers. However, if the separation of the matrix material also removes the colored coating from the fibers, the purpose of individual fiber identification will be negated.

One common method for providing mid-span access is to contact the matrix material with a solvent, such as ethanol or isopropyl alcohol. Such a solvent must have the ability of swelling or softening the matrix material. At the same time, the solvent should be selected so as not to swell the coatings on the individual optical glass fibers. The swelling of the matrix material weakens that matrix material so that it can then be mechanically removed by mild scrubbing or similar mechanical means to remove the matrix material and thereby provide access to the individual, but still coated and color-identifiable, optical glass fibers. An example of this solvent stripping method is described in the AT&T brochure "D-182355 Accuribbon™ Single Fiber Access" (Mar. 3, 1991).

Published European application number 0614099A2 discloses an optical fiber ribbon unit in which the bonding between the coloring layer of the individual optical glass fibers and the matrix layer is suppressed by adding 5% by weight or less of a release agent to each of the layers. The purpose of adding the release agent is to prevent the coloring layer from being peeled off when the matrix material is separated from the optical glass fibers. Examples of such release agents include a silicone release agent or a fluorine-base release layer.

Published Japanese Patent Application No. 64-22976 discloses radiation-curable ink compositions containing specific radiation-curable oligomers. The ink composition provides an ink coating having adhesion to the outer primary coating which is separable from the matrix material in a ribbon assembly.

Published Japanese Patent Application No. H1-152405 discloses a radiation-curable ink composition containing an organic polysiloxane compound. The polysiloxane compound provides the ink coating with the ability to separate more easily from the matrix material in a ribbon assembly.

U.S. Pat. No. 4,900,126 (Jackson) discloses an optical glass fiber ribbon unit in which each of the individually coated optical glass fibers has a colored outer layer. Each of the optical glass fibers is further coated with a release agent which has a low affinity for the bonding material or the colorant material. An example of the release agent is teflon. The release agent creates a weak boundary layer at the interface of the colorant material and the matrix material whereby the matrix can be separated from the optical glass fibers without removing the colored layer on the individual optical glass fibers.

U.S. Pat. No. 4,953,945 discloses using a peelable cured coating layer between an outer colored layer of optical glass fibers and the matrix material whereby the matrix material can be stripped from the optical glass fibers without removing the colored layer of the optical glass fibers.

U.S. Pat. No. 5,524,164 discloses a cable assembly comprising a plurality of ribbon assemblies. The common coating material that binds the ribbon assemblies together contains a component having poor compatibility with the main component in the common coating. Examples of such poor compatibility components include hydrocarbons having from 10 to 20 carbon atoms, silicone oils and fluorine oils. The poor compatibility component reduces the friction between the ribbon assemblies to prevent damage to the fibers when the cable is bent. The poor compatibility component provides a discontinuous layer on the common coating, in the form of "seas" and "islands". There is no disclosure or teachings relating to mid-span access to the individual coated optical glass fibers contained within the ribbon assemblies.

U.S. Pat. No. 5,561,730 discloses a cable containing a plurality of ribbon units. The common coating material that binds the ribbon assemblies together contains a release agent. Examples of such release agents are silicone oils and fluorine oils. The release agent component reduces the friction between the ribbon assemblies to prevent damage to the fibers when the cable is bent. There is no disclosure or teachings relating to providing mid-span access to the individual coated optical glass fibers contained within the ribbon assemblies.

U.S. Pat. No. 5,621,838 discloses a coated optical glass fiber unit made of a plurality of coated optical glass fibers which are bound together by a common bundling layer. The ink coating on the optical glass fibers and the common bundling layer are treated to suppress bonding between the layers so that the bundling layer can be removed from the ink layer. A silicone releasing agent or a fluorine releasing agent are added to the ink coating and the common bundling layer.

Silicone and fluorine based release agents can cause undesirable degradation of the inner primary and outer primary coatings over time. When they are not bound to the coating, they can leech out of the coating. They are often time incompatible with the desired coating composition. Thus, conventional silicone and fluorine release agents can only be used in small quantities, such as less than 5% by weight. If the conventional release agents are used in amounts greater than 5% they can cause the matrix material and ink coating to swell and they can collect between the matrix and the ink coating layer causing unavoidable peeling of the matrix from the optical glass fibers, thereby diminishing the protective function of the matrix material.

Use of acrylated silicone and fluorine based release agents in optical glass fiber coatings is also undesirable. For examples, these types of release agents are often incompatible with the components in the ink coating. Use of these types of release agents can also cause undesirable changes in the properties of the ink coating.

As the demand for coated optical glass fibers has increased, manufacturers must respond by adding more fiber drawing production lines and by attempting to increase the linear line speeds of the existing fiber drawing production lines. In the latter case, one factor which will determine the upper limit for the line speed will be the curing rate characteristics of the radiation-curable ink composition, for a given radiation source and intensity.

If the line speed is increased to the extent that cure rate time requirements of the radiation-curable ink composition are not provided, the radiation-curable ink composition will not have received a sufficient amount of radiation to cause complete cure, or cross-linking, of the radiation-curable ink composition. The production linear line speed is generally inversely related to the amount of radiation striking the optical glass fiber. That is, as the production line speed is increased the amount of radiation exposure to the radiation-curable ink composition during the production process will necessarily decrease for a given radiation source. Incomplete cure of the radiation-curable ink composition is undesirable and must be avoided because then the desired properties of the incompletely cured ink coating may not be achieved and/or the incompletely cured ink coating may retain tackiness (giving problems in subsequent handling) or a malodorous odor may be present, and there may also be an increase in the extractables (undesirable) in the supposedly-cured ink coating and a lack of adhesion to the coated optical glass fiber.

While the ink composition must have a very fast cure speed to ensure complete cure of the ink coating on the high speed drawing tower, the increase in cure speed should not come at the expense of other important properties of the ink coating, such as providing suitable mid-span access when used in ribbon assemblies. Therefore, there is a need for a radiation-curable ink composition that exhibits adaptable adhesion properties to provide an adhesion between the outer primary coating and the ink coating that is greater than the adhesion between the ink coating and the matrix material to provide mid-span access.

In addition, ink compositions should not contain ingredients that can migrate to the surface of the optical glass fiber and cause corrosion. The ink composition should also not contain ingredients which can cause instability in the protective coatings. Ink coatings for optical glass fibers should be color fast for decades, not cause attenuation of the signal transmission, be impervious to cabling gels and chemicals, and allow sufficient light penetration for fiber core alignment.

From the above, it is clear that optical glass fiber technology places many unique demands on radiation-curable ink compositions which more conventional technologies, such as printing inks, do not. There is a need for radiation-curable ink compositions that provide mid-span access and which avoid the problems associated with conventional fluorine and silicone based release agents.

Usually ink compositions must be cured in an inert atmosphere, i.e. in the absence of oxygen. Providing inert atmospheres on optical glass fiber drawing towers is expensive. Thus, a radiation-curable ink composition which exhibits a high cure speed in the presence of air would provide significant advantages over ink-compositions that must be cured in an inert atmosphere.

SUMMARY OF THE INVENTION

An objective of the present invention is to provide optical glass ribbon assemblies having the functional capability of providing mid-span access without the use of additives, monomers or oligomers containing fluorine or silicone.

Another objective of the present invention is to provide radiation-curable compositions, such as matrix forming compositions, ink coating compositions, and colored outer primary coating compositions, which are suitable for use in forming the ribbon assemblies.

It has now been found, that by formulating a radiation-curable ink composition or colored outer primary coating composition to contain an adhesion adjusting oligomer according to the present invention, surprisingly an ink coating or colored outer primary coating can be formed on a coated optical glass fiber which provides a ribbon assembly with the functional capability of mid-span access, without the requirement of using release agent additives containing fluorine or silicone. In particular, the polymeric matrix formed from the novel ink coating composition or colored outer primary coating according to the present invention is adapted to inherently provide mid-span access.

The present invention provides novel radiation-curable ink coating compositions and radiation-curable colored outer primary coating compositions adapted for forming ink coatings or colored outer primary coatings on optical glass fibers formulated from a composition comprising:
  an adhesion adjusting oligomer having at least one radiation-curable functional group bound to a low surface energy backbone and being substantially free-of silicone and fluorine.

The invention further provides a ribbon assembly comprising:
  a plurality of coated optical glass fibers; and
  a matrix material which binds said plurality of coated optical glass fibers together, wherein at least one of the coated optical glass fibers contains an ink coating or colored outer primary coating formulated from a radiation-curable composition comprising:
    an adhesion adjusting oligomer having at least one radiation-curable functional group bound to a low surface energy backbone and being substantially free-of silicone and fluorine. The adhesion adjusting oligomer is present in an amount which reduces the surface energy of the ink coating or the colored outer primary coating to a level that provides less adhesion between the ink coating or the colored outer primary coating and the matrix material than between the ink coating or the colored primary coating and a coating on the optical glass fiber adjacent to the ink coating or the colored outer primary coating.

The invention further provides a radiation-curable matrix forming composition formulated from a composition comprising:
  an adhesion adjusting oligomer having at least one radiation-curable functional group bound to a low surface energy backbone and being substantially free-of silicone and fluorine.

The invention also provides a novel ribbon assembly which exhibits the property of providing mid-span access to the individual optical glass fibers without the use of silicone and fluorine release agents in the ink coating, colored outer primary coating or matrix material. The ribbon assembly comprises:
  a plurality of coated optical glass fibers;
  a matrix material which binds said plurality of optical glass fibers together formed from a composition comprising an adhesion adjusting oligomer having at least one radiation-curable functional group bound to a low surface energy backbone and being substantially free-of silicone and fluorine.

DETAILED DESCRIPTION OF PREFERRED EMBODIMENTS

The improved radiation-curable ink coating composition according to the present invention is capable of providing mid-span access without the use of additives. In particular, the ink composition is adapted to provide a cured ink coating having a three dimensional, cross-linked polymeric matrix which exhibits the inherent property of providing mid-span access. Providing mid-span access in this manner is in a direction very different from the use of additives. However, if desired, conventional release agents may be added to tailor the properties of the ink composition as desired.

The improved ink composition of this invention can be based on any known ink composition for coating and identifying coated optical glass fibers. In general, the radiation-curable ink compositions contain at least one pigment dispersed within a radiation-curable carrier system. However, clear ink coatings can be formed, which are devoid of pigments, as desired. The conventional ink composition can become the improved ink composition according to the present invention by utilizing the novel radiation-curable adhesion adjusting oligomer in the radiation-curable carrier system. Surprisingly, the adhesion adjusting oligomer can even be utilized as the main oligomer in the radiation-curable carrier system. Alternatively, the improved ink composition according to the present invention can be formulated by combining the adhesion adjusting oligomer with pigments, diluent monomers and other oligomers, as desired.

Fluorine and silicone have been incorporated into ink coating compositions to provide mid-span access. It has now been found that fluorine and silicone reduce the surface energy of the resulting ink coating. It is believed that this lower surface energy reduces the bond strength between the ink coating and the matrix material in the following manner. A low surface energy generally results in less wetting when the liquid matrix material is applied. Less wetting results in less surface area contact and therefore lower adhesion between the matrix material and the ink coating. The present invention provides a reduced surface energy without the use of fluorine and silicone. The surface energy is reduced by utilizing a backbone in the adhesion adjusting oligomer which has a low surface energy. The low surface energy backbone contains pendent hydrocarbon side chains that reduce the surface energy. Examples of preferred low surface energy backbones include hydrocarbon backbones and polyester backbones. More preferably, the low surface energy backbone of the adhesion adjusting oligomer is a polyester.

The adhesion adjusting oligomer is preferably present in an amount which provides the ink coating with a surface energy having a top contact angle of greater than 65°, more preferably about 70° and greater, and even more preferably about 75° and greater, and most preferably about 80° and greater, without the use of conventional silicone and fluorine containing compounds.

The adhesion adjusting oligomer can be utilized to formulate ink coating compositions that are substantially-free of silicone and fluorine release agents, and free of other conventional release agents, which when suitably cured are capable of providing mid-span access. Even more surprisingly, such properties can be provided even though the ink compositions are cured in the presence of air.

Representative examples of the adhesion adjusting oligomer include oligomers containing at least one radiation-curable functional group bound to a low surface energy backbone. The radiation-curable functional group can be for example ethylenic unsaturation, which can be polymerized through radical polymerization or cationic polymerization. Specific examples of suitable ethylenic unsaturation are groups containing acrylate, methacrylate, styrene, vinylether, vinyl ester, N-substituted acrylamide, vinyl amide, maleate esters, and fumarate esters. Preferably, the ethylenic unsaturation is provided by a group containing acrylate, methacrylate, or N-vinyl functionality.

Adhesion adjusting oligomers based on polyesters will be described first. The radiation-curable functional group(s) can be directly bound to the polyester backbone or can be connected to the polyester via a linking group. Examples of suitable linking groups include urethane, urea, and ester groups.

The polyester based adhesion adjusting oligomer usually has a number average molecular weight of from about 500 to about 10,000, more preferably about 1,000 to about to about 8,000. The polyester usually has about 2 to about 40, preferably about 3 to about 20, and most preferably about 5 to about 15 equivalents of ester groups.

The polyester contains hydrocarbon side-chains which are pendent to the polyester backbone chain. Without being bound by any theory, it is believed that the pendent hydrocarbon side chains provide the cured ink coating with the capability of releasing from the surface of a matrix material to provide a coherent layer of matrix material. In particular, it is believed that the hydrocarbon side chains reduce the surface energy of the ink coating in combination with providing entanglements and non-bonded associations leading to sufficient adhesion between the ink coating and the matrix material to avoid undesirable delamination. While the entanglements and non-bonded associations may provide adhesion, the entanglements and non-bonded associations can be broken during mid-span access to provide a clean, bare ink coated optical glass fiber and a coherent layer of matrix material.

Preferably, the hydrocarbon side chains are located sufficiently near the ester groups that they can stearically hinder chemical attack of the ester functional groups. For example, a hydrocarbon side chain can be located on the carbon atom alpha to the ester functional group to provide stearic hindrance. Thus, it has been found that surprisingly the hydrocarbon side chains can be utilized for two purposes, (1) to reduce the surface energy of the ink coating, and (2) to provide hydrolytic stability to the polyester backbone in the coating.

The hydrocarbon side chains should be present in an amount which provides the adhesion adjusting oligomer with the capability of reducing the surface energy of the ink coating. Preferably, at least about 5%, more preferably at least about 10%, and most preferably at least about 15% of the number average molecular weight of the adhesion adjusting oligomer is comprised of hydrocarbon side chains. The use of hydrocarbon side-chains to reduce the surface energy applies generally to all types of polymeric backbones and is not limited to polyester backbones. The amount of hydrocarbon side chains should not be so great as to cause unwanted properties, such as too high of a viscosity of the uncured ink coating composition, or too low of a modulus and/or tensile strength of the cured ink coating. Thus, the portion of the number average molecular weight of the adhesion adjusting oligomerattributed to the hydrocarbon side chains should be less than about 40%, more preferably less than about 30%, and most preferably less than about 20%.

Preferably, the hydrocarbon side chains are substantially uniformly spaced apart on the polyester backbone. A particularly preferred structure is a comb-like structure, in which the hydrocarbon side chains are like the teeth protruding from the backbone of the comb. However, the hydrocarbon side-chains can protrude from the polyester backbone in different directions, as opposed to the two dimensional teeth of a comb.

The hydrocarbon side chains are preferably lower alkyls or alkyl substituted aryls having from about 3 to about 30 carbon atoms, preferably about 5 to about 20 carbon atoms, and most preferably about 5 to about 15 carbon atoms. The alkyl and/or alkyl substituted aryl groups may be linear, branched or cyclic as desired. Therefore, propyl, n-butyl, i-butyl, 2-ethylbutyl, pentyl, hexyl, heptyl, octyl, nonyl, decyl, undecyl, dodecyl, tetradecyl, propyl phenol, butyl phenol, pentyl phenol, hexyl phenol, heptyl phenol, octyl phenol, nonyl phenol and the like are suitable. Linear or branched alkyl groups are preferred. When an alkyl substituted aryl is utilized, preferably the alkyl group is para to where the aryl is bound to the polyester backbone. Preferably, the hydrocarbon side chain is a lower alkyl.

Preferably, at least about 50%, more preferably at least about 70%, even more preferably at least about 90%, and most preferably substantially all of the ester functional groups present in the polyester backbone are stearically hindered by a hydrocarbon side chain(s).

The polyester backbone of the adhesion adjusting oligomer can be formed by any suitable means. Based on the disclosure provided herein, one skilled in the art will be able to provide the desired polyester backbone. For example, the following methods are suitable for making the polyester backbone having hydrocarbon side chains.

(1) Hydroxy carboxylic acids and polyols can be reacted to provide a polyester having hydrocarbon side chains. The polyol can be branched and/or the hydroxy carboxylic acid can be branched to provide hydrocarbon side chains protruding from the polyester backbone. Alternatively, the hydroxy carboxylic acid and/or polyol can contain a non-terminal hydroxy functional group such that upon reaction with a carboxylic acid to form an ester group, a side chain is obtained during formation of the polyester backbone.

(2) Poly carboxylic acids and polyols can be reacted to provide a polyester having hydrocarbon side chains. The polyol can be branched and/or the polycarboxylic acid can be branched to provide hydrocarbon side chains protruding from the polyester backbone. Alternatively, the polyol can contain a non-terminal hydroxy functional group such that upon reaction with a carboxylic acid to form an ester group, a side chain is formed in the polyester backbone.

The polyester backbone of the adhesion adjusting oligomer is preferably formed by reacting a suitable hydroxy carboxylic acid with a suitable diol. The term hydroxy carboxylic acid as used herein includes hydroxy carboxylic fatty acids. Preferably, the hydroxy functional carboxylic acids have from about 4 to about 30 carbon atoms, and more preferably from about 8 to about 24 carbon atoms. Examples of suitable hydroxy carboxylic fatty acids include hydroxy caprylic acid, hydroxy capric acid, hydroxy lauric acid, hydroxy myristic acid, hydroxy palmitic acid, hydroxy stearic acid, hydroxy oleic acid, hydroxy linoleic acid, and hydroxy linolenic acid. Specific examples of suitable hydroxy carboxylic acids include 12-hydroxystearic acid, 2-hydroxy-4-methyl valeric acid, 12-hydroxy-4-octyl-dodecanoic acid, δ-dodecanolactone, 19-hydroxy-10-hexyl-nonadecanoic acid, and 16-hydroxy-4-nonyl-11-butyl-hexadecanoic acid. Commercially available examples of suitable hydroxy carboxylic acids include the P-10 acids from CasChem Inc.

The hydroxy carboxylic acid preferably has a structure which results in a polyester having hydrocarbon side chains when the hydroxy functional groups are reacted to form ester groups. If branched hydroxy functional carboxylic acids are utilized, the hydroxy functional group can be terminal. However, if linear hydroxy carboxylic acids are utilized, a non-terminal hydroxy functional group should be present so that a hydrocarbon side chain bound to the polyester backbone is formed when the hydroxy functional group is reacted to form an ester linkage.

The hydroxy carboxylic fatty acid can contain more than one hydroxy group. Preferably, the hydroxy carboxylic fatty acid contains only one unsaturated bond.

The hydroxy carboxylic acid preferably contains at least one hydrocarbon side chain, as shown in the following representative formula (1):

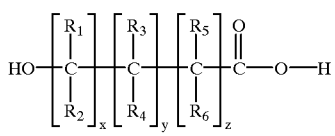
(1)

Where: H=a hydrogen atom;
O=an oxygen atom;
$R_1$, $R_2$, $R_3$, $R_4$, $R_5$, and $R_6$=H or hydrocarbon side chains, with the proviso that at least one of $R_1$ through $R_6$ is a hydrocarbon side chain, preferably $R_1$ and $R_2$ are not both H; and
$X+Y+Z \geq 3$, preferably $\geq 5$, more preferably $\geq 10$.

The hydrocarbon side chains are preferably close enough to the ester group formed by the reaction between the hydroxyl group and carboxylic acid group that the hydrocarbon side chain(s) can stearically hinder chemical attack of the ester functional group. For example, ester groups are susceptible to hydrolysis in the presence of moisture. However, it has been found that if the hydrocarbon side chains are strategically placed, they can stearically hinder the hydrolysis reaction. Thus, ink coatings based on polyesters having stearically hindered ester groups can be inherently more resistant to chemical attack.

Examples of suitable adhesion adjusting oligomers can be represented by the following non-limiting formulae in which the listed components are reacted:

(2)
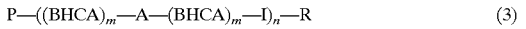
(3)
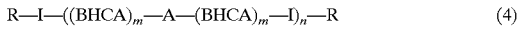
(4)

where BHCA is a hydroxy carboxylic acid which is branched and/or which contains a non-terminal hydroxy functional group that provides a hydrocarbon side chain bound to the polyester backbone upon reaction of the hydroxy functional group to form an ester group;
where I is a polyisocyanate compound;
A is a polyol;
P is compound containing at least one hydroxy functional group;
R is a hydroxy functional compound containing a radiation-curable functional group;
n is from 1 to about 20 preferably about 1 to about 10 on average; and
m is from 1 to about 50, preferably about 1 to about 30 on average. The adhesion adjusting oligomer according to the present invention is not limited by the formulae 2 through 4. For example, the adhesion adjusting oligomer may comprise a branched polyester backbone by using a polyol having more than two hydroxy functional groups. However, linear polyester backbones having carbon-containing side chains, as shown in formulae 2 through 4, are preferred. The term "branched polyester" does not include the term "linear polyester having carbon-containing side chains". Only those polyesters that contain side branches composed of complete monomer units are "branched polyesters." The use of the terms "branched" and "side-chains" is as defined in Odian, "Principles of Polymerization", third edition, pgs. 17–19, which pages are incorporated herein by reference.

In the formulae 2 through 4, the isocyanate groups are reacted with the hydroxyl groups to form urethane linkages, which is a well known reaction. The hydroxy carboxylic acids are polymerized to form the polymeric polyester backbone of the adhesion adjusting oligomer. Mixtures of hydroxy carboxylic acids can be used to tailor the properties of the polyester as desired. The water formed during formation of the ester groups can be removed via any suitable method, such as by distillation.

After forming the polyester backbone, the end terminal hydroxy carboxylic groups of the formed polyester can be reacted with the polyisocyanate and hydroxy functional radiation curable functional group to form a urethane linkage between the polyester backbone and the radiation-curable functional group. The radiation-curable functional groups can also be bound to the polyester backbone at a location other than the end terminals of the polyester backbone. These types of reactions are well known in the art and therefore one skilled in the art will easily be able to form the desired oligomer based on the disclosure provided herein.

The radiation-curable functional group can be connected to the polyester backbone via any suitable linking group. For example, the polyester backbone can be formed such that carboxylic acid functional groups remain on the polyester backbone. The carboxylic acid functional groups can be reacted with the hydroxy group of the hydroxy functional radiation-curable compound to provide an ester linkage between the polyester backbone and the radiation-curable compound.

In a first embodiment, "A" can be an alkyl polyol having from about 2 to about 50 carbon atoms, more preferably from about 5 to about 30 carbon atoms. The polyols can be straight chained or branched, as desired. Preferably, the polyol contains hydrocarbon side chains that are pendent to the carbon(s) which are alpha or beta to the hydroxy functional groups. Suitable hydrocarbon side chains include those described herein above. While diols are preferred, polyols can be used to provide the desired level of branching.

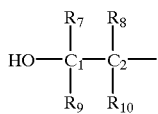
(5)

Where H=a hydrogen atom;
O=an oxygen atom;
$C_1$=is the carbon atom alpha to the hydroxy functional group;
$C_2$=is the carbon atom beta to the hydroxy functional group; and
$R_7$, $R_8$, $R_9$ and $R_{10}$=are each H or hydrocarbon moieties, with the proviso that $R_7$, $R_8$, $R_9$ and $R_{10}$ are not all H, and preferably at least one of $R_7$, $R_8$, $R_9$ or $R_{10}$ is a hydrocarbon side chain as described herein.

The hydrocarbon moieties, $R_7$, $R_8$, $R_9$ and $R_{10}$, can stearically hinder chemical attack of the polyester formed by the reaction between the hydroxy functional group and a carboxylic acid. As discussed previously, ester groups are susceptible to hydrolysis in the presence of moisture. However, the hydrocarbon moieties can stearically hinder the hydrolysis reaction. Thus, ink coatings based on polyesters having this structure can be inherently more resistant to chemical attack.

A particularly preferred diol is represented by the following formula (6):

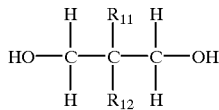
(6)

Where H=a hydrogen atom;
O=an oxygen atom;
C=is a carbon atom; and
$R_{11}$ and $R_{12}$=are each H or hydrocarbon side chains with the proviso that $R_{11}$ and $R_{12}$ are not both H. Preferably, $R_{11}$ and $R_{12}$ are both alkyls having from about 1 to about 12 carbon atoms, and most preferably about 2 to about 6 carbon atoms. More preferably, at least one of $R_{11}$ or $R_{12}$ is a hydrocarbon side chain as described herein.

Specific examples of suitable polyols include the following:
2-methyl-1,3-propane diol;
2,2-dimethyl-1,3-propanediol;
2-ethyl-1,3-propanediol;
2,2-diethyl-1,3-propanediol;
2-propyl-2-methyl-1,3-propanediol;
2-propyl-2-ethyl-1,3-propanediol;
2-butyl-2-ethyl-1,3-propanediol;
2-cyclohexyl-2-methyl-1,3-propanediol;
2-phenyl-2-methyl-1,3-propanediol;
1,2-propanediol;
1,4-butanediol;
1,6-hexanediol;
1,2-cyclohexanediol;
1,3-cyclohexanediol;
1,4-cyclohexanediol;
cyclohexyldimethanol;
2,2-dimethyl-4,4-dimethyl-1,5-pentanediol;
ethyleneglycol;
diethyleneglycol;
dipropyleneglycol;
1,9-nonanediol;
the like; and
mixtures thereof.

If desired, an oligomer polyol can be used. Preferably, the oligomer polyol is a diol. If an oligomer diol is used, preferably it has on average at least about 2 hydroxyl groups. The oligomer polyol may have, on average, more than 2 hydroxyl groups. If the oligomer polyol has more than 2 hydroxyl groups, branched adhesion adjusting oligomers can be formed. Examples of suitable oligomer diol include polyether diols, polyolefin diols, polyester diols, polycarbonate diols, and mixtures thereof. Polyester diols are preferred.

If a polyether diol is used, preferably the polyether is a substantially non-crystalline polyether. Preferably, the polyether comprises repeating units of one or more of the following monomer groups:

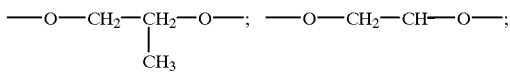
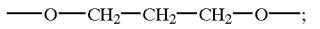
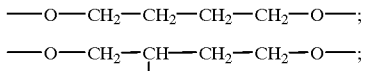
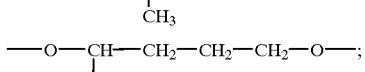
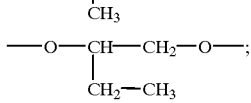

and

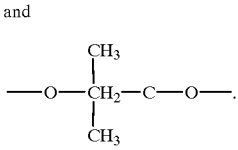

The polyether diol can be made from epoxy-ethane, epoxy-propane, tetrahydrofuran, methyl-substituted tetrahydrofuran, epoxybutane, and the like. An example of a polyether that can be used as the polyether diol is the polymerization product of 20 percent by weight of 3-methyltetrahydrofuran and 80 percent by weight of tetrahydrofuran, both of which have undergone a ring opening polymerization. This polyether copolymer contains both branched and non-branched oxyalkylene repeating units and is marketed as PTG-L 1000 (Hodogaya Chemical Company of Japan). Another example of a polyether diol that can be used is PTG-L 2000 (Hodogaya Chemical Company).

If a polyolefin diol is used, the polyolefin is preferably a linear or branched hydrocarbon containing a plurality of hydroxyl end groups. Preferably, the hydrocarbon is a non-aromatic compound containing a majority of methylene groups (—$CH_2$—) and which can contain internal unsaturation and/or pendent unsaturation. Fully saturated, for example, hydrogenated hydrocarbons, are preferred because the long term stability of the cured optical fiber coating increases as the degree of unsaturation decreases. Examples of hydrocarbon diols include, for example, hydroxyl-terminated, fully or partially hydrogenated 1,2-polybutadiene; 1,4- 1,2-polybutadiene copolymers, 1,2-polybutadiene-ethylene or -propylene copolymers, polyisobutylene polyol; mixtures thereof, and the like. Preferably, the hydrocarbon diol is a substantially, fully hydrogenated 1,2-polybutadiene or 1,2-polybutadiene-ethene copolymer.

Examples of polycarbonate diols are those conventionally produced by the alcoholysis of diethylene carbonate with a diol. The diol can be, for example, an alkylene diol having about 2 to about 12 carbon atoms, such as, 1,4-butane diol, 1,6-hexane diol, 1,12-dodecane diol, and the like. Mixtures of these diols can also be utilized. The polycarbonate diol can contain ether linkages in the backbone in addition to carbonate groups. Thus, for example, polycarbonate copolymers of alkylene oxide monomers and the previously described alkylene diols can be used. Alkylene oxide monomers include, for example, ethylene oxide, tetrahydrofuran, and the like. These copolymers produce cured coatings that exhibit a lower modulus and also inhibit crystallinity of the liquid coating composition compared to polycarbonate diol homopolymers. Admixtures of the polycarbonate diols and polycarbonate copolymers can also be utilized.

Polycarbonate diols include, for example, Duracarb 122 (PPG Industries) and Permanol KM10-1733 (Permuthane, Inc., Ma.). Duracarb 122 is produced by the alcoholysis of diethylcarbonate with hexane diol.

Examples of polyesterdiols includethe reaction products of saturated polycarboxylic acids, or their anhydrides, and diols. Saturated polycarboxylic acids and anhydrides include, for example, phthalic acid, isophthalic acid, terephthalic acid, trimellitic acid, tetrahydrophthalic acid, hexahydrophthalic acid, tetrachlorophthalic acid, adipic acid, azelaic acid, sebacic acid, succinic acid, glutaric acid, malonic acid, pimelic acid, suberic acid, 2,2-dimethylsuccinic acid, 3,3-dimethylglutaric acid, 2,2-dimethylglutaric acid, the like, anhydrides thereof and mixtures thereof. Diols include, for example, 1,4-butanediol, 1,8-octane diol, diethylene glycol, 1,6-hexane diol, dimethylol cyclohexane, and the like. Included in this classification are the polycaprolactones, commercially available from Union Carbide under the trade designation Tone Polylol series of products, for example, Tone 0200, 0221, 0301, 0310, 2201, and 2221. Tone Polyol 0301 and 0310 are trifunctional.

The polyol "A" is preferably present in a minor amount, compared to the amount of hydroxy carboxylic acid. Preferably, the polyol "A" is present in an amount of about 10% by weight or less, more preferably about 7% by weight or less, based on the total weight of reactants used to form the adhesion adjusting oligomer.

Any organic polyisocyanate alone or in admixture, can be used as the polyisocyanate. Examples of suitable diisocyanates include:

isophorone diisocyanate (IPDI),
toluene diisocyanate (TDI),
tetramethylenexylene diisocyanate (TMXDI)
diphenylmethylene diisocyanate,
hexamethylene diisocyanate,
cyclohexylene diisocyanate,
methylene dicyclohexane diisocyanate,
2,2,4-trimethyl hexamethylene diisocyanate,
m-phenylene diisocyanate,
4-chloro-1,3-phenylene diisocyanate,
4,4'-biphenylene diisocyanate,
1,5-naphthylene diisocyanate,
1,4-tetramethylene diisocyanate,
1,6-hexamethylene diisocyanate,
1,10-decamethylene diisocyanate,
1,4-cyclohexylene diisocyanate, and
polyalkyloxide and polyester glycol diisocyanates such as polytetramethylene ether glycol terminated with TDI and polyethylene adipate terminated with TDI, respectively. Preferably, the polyisocyanate is TDI, IPDI orTMXDI.

Any suitable hydroxy functional radiation-curable compound can be used. Such compounds having (meth)acrylate functional groups include, for example, hydroxy functional acrylates such as 2-hydroxyethyl acrylate, 2-hydroxypropyl acrylate, and the like. Compounds having vinyl ether functional groups include, for example, 4-hydroxybutyl vinyl ether, and triethylene glycol monovinyl ether. Compounds having maleate functional groups include, for example, maleic acid and hydroxy functional maleates.

Hydroxy functional compounds providing an epoxy functionality are for example epichlorohydrine that can be reacted with an hydroxy group of the oligomer diol, or compounds having one or more epoxy groups and a hydroxy group that can be reacted with a polyisocyanate, for example, oligomers of bisphenol-A bis epoxy resins.

Hydroxy functional compounds providing an amine-ene or thiol-ene systems can contain, for example, an allylic unsaturation, or tertiary amine or thiol groups. Thus, the adhesion adjusting oligomer can be provided with allylic unsaturation by reaction of an isocyanate with trimethylolpropanediallylether, or the adhesion adjusting oligomer can be provided with an amine functional group by reaction of the isocyanate with amine functional compounds. Such compounds include, for example: the adduct of trimethylolpropane, isophoronediisocyanate and di(m) ethylethanolamine, the adduct of hexanediol, isophoronediisocyanate and dipropylethanol amine, and the adduct of diethylethanolamine, dimethylethanolamine or dipropylethanolamine.

The polyol, polyisocyanate and hydroxy functional radiation-curable compound are preferably reacted in a proportion such thatforone equivalent of the hydroxy functional group of the polyol, about 1.1 to about 1.3 equivalents of the isocyanate group contained in the polyisocyanate and about 0.2 to about 1.5 equivalents of the hydroxy functional group contained in the hydroxy functional radiation-curable compound are used. It is desirable that the equivalent of the hydroxy functional groups in the polyol and the hydroxy functional radiation-curable compound be almost equal to the equivalent of the isocyanate group in the polyisocyanate.

In the reaction of these compounds, a catalyst for the urethane forming reaction can be utilized. Examples of suitable catalysts include:

copper naphthenate;
cobalt naphthenate;
zinc naphthenate;
n-butyl-tin-dilaurylate;
triethylamine;
1,4-diazabicyclo(2,2,2)octane; and
2,6,7-trimethyl-1,4-diazabicyclo(2,2,2)octane.

The catalyst is generally used in an amount of about 0.01 to about 1 part by weight for 100 parts by weight of the reaction raw materials. The reaction temperature is normally in the range of from 10° C. to about 90° C., preferably about 30° C. to about 80° C.

Particularly preferred adhesion adjusting oligomers are represented by the following formula (7):

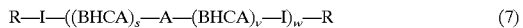

$$R-I-((BHCA)_s-A-(BHCA)_v-I)_w-R \qquad (7)$$

The oligomer (7) was formed by reacting the following components:

R=a hydroxy functional, radiation- curable compound:
I=a polyisocyanate compound:
BHCA=a hydroxy carboxylic acid which is branched and/or which contains a non-terminal hydroxy functional group that provides a carbon-containing side chain bound to the polyester backbone upon reaction of the hydroxy functional group to form an ester group;
A=a polyol;
W=1 to about 20, preferably 1 to about 10, and most preferably 1 to about 5; and
S+V=4 to about 20, preferably about 5 to about 15, and most preferably about 12 on average. Alternatively, the radiation-curable functional groups "R" can be bound directly to the polyester backbone by reacting the hydroxy functional group of "R" with a carboxylic acid functional group on the polyester backbone to form an ester linkage. In this manner, the use of a polyisocyanate can be avoided.

A particularly preferred releasing oligomer is poly (hydroxystearic acid) urethane acrylate, which is represented by the following oligomer (8):

$$HA-I-Poly(HSA)-I-HA \qquad (8)$$

The oligomer (8) was formed from the following components:

HA=hydroxyethyl acrylate,
I=isophorone diisocyanate; and
Poly(HSA), which is represented by the following formula (9)

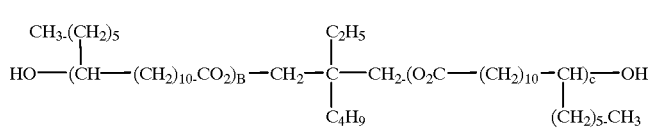

Where B+C=2 to about 20, preferably about 5 to about 15, and most preferably about 12 on average.

Another suitable way of formulating the releasing oligomer is to react polycarboxylic acids with polyols. The following formulae are representative examples of such reactions:

$$R-I-(A-(PAC-A)_t)-I-R \qquad (10)$$

$$R-(PAC-A)_t-I-R \qquad (11)$$

$$R-(PAC-(A-PAC)_t)-R \qquad (12)$$

Where PAC is a polycarboxylic compound;
I=a polyisocyanate compound;
R=a hydroxy functional radiation-curable compound;
A=a polyol; and
t=1 to about 20, preferably about 1 to about 15 on average.
At least one of the polycarboxylic acid or the polyol is branched to provide a polyester backbone having carbon-containing side chains, or the polyol contains a non-terminal hydroxy functional group which provides a polyester backbone having carbon-containing side chains upon reaction of the hydroxy-functional group with a carboxylic acid to form an ester functional group. The structure of the releasing oligomer is not limited by the formulae 10 through 12.

I, R and A can be any of the compounds as described herein above.

PAC can be any polycarboxylic acid compound. Suitable dicarboxylic acids include:

oxalic acid;
malonic acid;
succinic acid;
glutaric acid;
adipic acid;
pimelic acid;
suberic acid;
azelaic acid;
sebacic acid;
maleic acid;
fumaric acid;
phthalic acid;
isophthalic acid;
terephthalic acid;
hemimellitic acid;
trimellitic acid; and
trimesic acid.

Carboxylic acids having more than two carboxylic acids can also be utilized.

Adhesion adjusting oligomers having a polyester backbone can be used in significantly greater amounts than conventional silicone and fluorine containing release agents. In particular, such adhesion adjusting oligomers can be used in amounts from about 1 to about 90 wt. %, preferably about 5 to about 80 wt. %, more preferably about 10 to about 70 wt. %, based on the total weight of the radiation-curable ink coating composition.

Further examples of suitable adhesion adjusting oligomers are hydrocarbon compounds containing at least one radiation-curable functional group and pendent hydrocarbon side chains. Such adhesion adjusting compounds contain a hydrocarbon backbone having a number average molecular weight of about 1000 to about 10,000, preferably about 2,000 to about 8,000, to which at least one radiation-curable functional group is bound. The radiation-curable functional group can be bound to the hydrocarbon in any suitable manner, such as those described herein in reference to the polyester backbone.

Examples of preferred hydrocarbons include polyethylene, polybutylene, polypropylene, and copolymers of ethylene, butylene and propylene. While neoprene and polybutadiene polymers can also be used, preferably, the polyneoprene and polybutadiene are fully hydrogenated.

A preferred adhesion adjusting oligomer is polyethylenebutylene acrylate having number average molecular weight of about 4500. A commercially available example of such an oligomer is Kraton L1203 (Shell Chemical Co.).

Adhesion adjusting oligomers having a hydrocarbon backbone can be used in significantly greater amounts than conventional silicone and fluorine containing release agents. In particular, such adhesion adjusting oligomers can be used in amounts from about 1 to about 90 wt. %, preferably about 5 to about 80 wt. %, more preferably about 10 to about 70 wt. %, based on the total weight of the radiation-curable ink coating composition.

The adhesion adjusting oligomer can be used as the main oligomer in the ink coating composition. However, usually other radiation-curable oligomers and monomers are combined with the adhesion adjusting oligomer to tailor the properties of the ink coating as desired. Preferably, the radiation-curable monomers and oligomers present in the radiation-curable carrier system are selected to be compatible with the adhesion adjusting oligomer such that the adhesion adjusting oligomer remains dissolved or dispersed in the liquid radiation-curable carrier system. The compatibility of the monomers and oligomers with the adhesion adjusting oligomer can be easily determined, as shown in examples below. In particular, the adhesion adjusting oligomer can be combined with the desired monomers and oligomers. If a hazy mixture is observed, then the monomer or oligomer may be incompatible with the adhesion adjusting oligomer. However, an incompatible mixture of monomers, oligomers and adhesion adjusting oligomer can also be used if desired. However, the ink composition may have to be agitated to disperse the adhesion adjusting oligomer before application.

Commercial examples of suitable ink compositions that can be reformulated to contain a adhesion adjusting oligomer according to the present invention include the UV curable inks available from DSM Desotech, Inc., which are based on multi-functional acrylate monomers.

Ink coatings are usually about 3 to about 10 microns thick and are usually concentric to prevent attenuation of the signal transmission. However, if desired, the ink coating can be applied in any form suitable to provide visible color identification of the individual coated optical glass fibers. Examples of suitable coatings include dashes, dots, lines, and rings. Preferably, the ink coating is substantially concentric. The ink coating compositions according to the present invention are capable of providing substantially concentric ink coatings, as well as discontinuous coatings such as dashes, dots, lines, and rings. When less than a concentric coating is applied, the adhesion adjusting oligomer can be utilized to provide separation of the matrix material from the dotted, dashed, or otherwise applied ink coating.

The ink coating also generally has a Tg of at least about 50° C., more preferably at least about 70° C. One of ordinary skill in the art of formulating radiation-curable ink compositions knows how to adjust the radiation-curable composition to provide the desired properties of the cured coating. Thus, radiation-curable compositions which are usually used for forming outer primary coating compositions can be reformulated and utilized as the radiation-curable carrier system in the ink composition according to the present invention. Examples of suitable radiation-curable compositions which may be reformulated variously include those which are disclosed in U.S. Pat. Nos. 4,624,994; 4,682,851; 4,782,129; 4,794,133; 4,806,574; 4,849,462; 5,219,896; and 5,336,563, all of which are incorporated herein by reference.

Radiation-curable carrier systems which are suitable for forming the present ink composition contain one or more radiation-curable oligomers or monomers having at least one functional group capable of polymerization when exposed to actinic radiation. Suitable radiation-curable oligomers or monomers are now well known and within the skill of the art.

Commonly, the radiation-curable functionality used is ethylenic unsaturation, which can be polymerized through radical polymerization or cationic polymerization. Specific examples of suitable ethylenic unsaturation are groups containing acrylate, methacrylate, styrene, vinylether, vinyl ester, N-substituted acrylamide, N-vinyl amide, maleate esters, and fumarate esters. Preferably, the ethylenic unsaturation is provided by a group containing acrylate, methacrylate, or N-vinyl functionality.

Another type of functionality generally used is provided by, for example, epoxy groups, or thiol-ene or amine-ene systems. Epoxy groups can be polymerized through cationic polymerization, whereas the thiol-ene and amine-ene systems are usually polymerized through radical polymerization. The epoxy groups can be, for example, homopolymerized. In the thiol-ene and amine-ene systems, for example, polymerization can occur between a group containing allylic unsaturation and a group containing a tertiary amine or thiol.

Preferably, at least about 80 mole %, more preferably, at least about 90 mole % of the radiation-curable functional groups present in the oligomer are acrylate, methacrylate and N-vinyl.

A mixture of mono-, di-, tri-, tetra-, and higher functionalized oligomers can be used to achieve the desired balance of properties, wherein the functionalization refers to the number of radiation-curable functional groups present in the oligomer.

The oligomers usually comprise a carbon-containing backbone structure to which the radiation-curable functional group(s) are bound. Examples of suitable carbon-containing backbones include polyethers, polyolefins, polyesters, polyamides, and polycarbonates. The size of the carbon-containing backbone can be selected to provide the desired molecular weight. The number average molecular weight of the oligomer is usually between about 500 to about 10,000, preferably between about 500 to about 7,000, and most preferably between about 1,000 to about 5,000.

For example, the carbon-containing backbone of the oligomer can comprise aromatic groups and ring-opened epoxy groups or alkoxy groups. The oligomer can be represented by, for example:

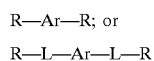

where R is a radiation-curable functional group,

Ar is an aromatic group containing moiety, and

L is a linking group.

Examples of suitable linking groups include alkoxy or ring opened epoxy such as ethoxy, propoxy, butoxy, and repeat units thereof. L can also be a urethane or urea linking group.

The aromatic groups can be, for example, derived from bisphenol units, such as bisphenol A. A preferred oligomer is a diglycidyl ether derivative of bisphenol A to which acrylate functional groups have been bound. A commercially available example of such an oligomer is CN-120 (Sartomer), which has a molecular weight of about 1300, and when cured has a T.g. of about 65° C.

Another example of a preferred oligomer is a trifunctional polyether or polyester having a molecular weight of about 500 to about 5000. A preferred example of a trifunctional oligomer is the commercially available polyurethane triacrylate Ebecryl 264, which has a molecular weight of about 2000 and when cured a T.g. of about 42° C.

The radiation-curable carrier systems may also contain a reactive diluent which is used to adjust the viscosity. The reactive diluent can be a low viscosity monomer containing having at least one functional group capable of polymerization when exposed to actinic radiation. Usually, the viscosity of the low viscosity diluent monomer is from about 50 to about 500 centipoise at 25° C. Examples of suitable viscosities for optical glass fiber coating compositions range from about 500 to about 50,000 centipoise at 25° C. This functional group may be of the same nature as that used in the radiation-curable monomer or oligomer. Preferably, the functional group present in the reactive diluent is capable of copolymerizing with the radiation-curable functional group present on the radiation-curable monomer or oligomer.

For example, the reactive diluent can be a monomer or mixture of monomers having an acrylate or vinyl ether functionality and an $C_4$–$C_{20}$ alkyl or polyether moiety. Particular examples of such reactive diluents include:

hexylacrylate,
2-ethylhexylacrylate,
isobornylacrylate,
decyl-acrylate,
laurylacrylate,
stearylacrylate,
2-ethoxyethoxy-ethylacrylate,
laurylvinylether,
2-ethylhexylvinyl ether,
N-vinyl formamide,
isodecyl acrylate,
isooctyl acrylate,
vinyl-caprolactam,
N-vinylpyrrolidone,
and the like.

Another type of reactive diluent that can be used is a compound having an aromatic group. Particular examples of reactive diluents having an aromatic group include:

ethyleneglycolphenylether-acrylate,
polyethyleneglycolphenyletheracrylate,
polypropyleneglycolphenylether-acrylate, and
alkyl-substituted phenyl derivatives of the above monomers, such as polyethyleneglycolnonylphenyl-etheracrylate.

The reactive diluent can also comprise a diluent having two or more functional groups capable of polymerization. Particular examples of such monomers include:

$C_2$–$C_{18}$ hydrocarbon-dioldiacrylates,
$C_4$–$C_{18}$ hydrocarbondivinylethers,
$C_3$–$C_{18}$ hydrocarbon triacrylates, and the polyether analogues thereof, and the like, such as
1,6-hexanedioldiacrylate,
trimethylolpropanetri-acrylate,
hexanedioldivinylether,
triethylene-glycoldiacrylate,
pentaerythritol-triacrylate,
ethoxylated bisphenol-A diacrylate, and
tripropyleneglycol diacrylate.

If the radiation-curable functional group of the radiation-curable monomer or oligomer is an epoxy group, for example, one or more of the following compounds can be used as the reactive diluent:

epoxy-cyclohexane,
phenylepoxyethane,
1,2-epoxy-4-vinylcyclohexane,
glycidylacrylate,
1,2-epoxy-4-epoxyethyl-cyclohexane,
diglycidylether of polyethylene-glycol,
diglycidylether of bisphenol-A, and the like.

If the radiation-curable functional group of the radiation-curable monomer or oligomer has an amine-ene or thiol-ene system, examples of reactive diluents having allylic unsaturation that can be used include:

diallylphthalate,
triallyltri-mellitate,
triallylcyanurate,
triallylisocyanurate, and
diallylisophthalate.

For amine-ene systems, amine functional diluents that can be used include, for example:

the adduct of trimethylolpropane, isophoronediisocyanate and di(m)ethylethanolamine,
the adduct of hexanediol, isophoronediisocyanate and dipropylethanolamine, and
the adduct of trimethyl propane, tri-methylhexamethylenediisocyanate and di(m) ethylethanolamine.

The radiation-curable ink composition can contain free-radical generating photoinitiators. Examples of suitable free radical-type photoinitiators include, but are not limited to, the following:

isobutyl benzoin ether;
2,4,6 trimethylbenzoyl diphenylphosphine-oxide;
1-hydroxycyclohexylphenyl ketone;
2-benzyl-2-dimethylamino-1-(4-morpholinophenyl)-butan-1-one;
2,2-dimethoxy-2-phenylacetophenone;
perfluorinated diphenyl titanocene;
2-methyl-1-[4-(methylthio)phenyl]-2-(4-morpholinyl)-1-propanone;
2-hydroxy-2-methyl-1-phenyl propan-1-one;
4-(2-hyd roxyethoxy)phenyl-2-hydroxy-2-propyl ketone dimethoxyphenylacetophenone;
1-(4-isopropylphenyl)-2-hydroxy-2-methylpropan-1-one;
1-(4-dodecyl-phenyl)-2-hydroxy-2-methylpropan-1-one;
4-(2-hydroxyethoxy)phenyl-2(2-hydroxy-2-propyl)-ketone;
diethoxyphenyl acetophenone;
a mixture of (2,6-dimethoxy benzoyl)-2,4,4 trimethylpentylphosphineoxide and 2-hydroxy-2-methyl-1-phenyl-propan-1-one;
benzophenone;
1-propanone, 2-methyl-1-1-(4-(methylthio)phenyl)2-(4-morpholinyl); and
mixtures of these.

Other additives which can be used in the radiation-curable carrier system include, but are not limited to, catalysts, lubricants, wetting agents, antioxidants and stabilizers. The selection and use of such additives is within the skill of the art.

Coated optical fibers are often used in ribbon assemblies. Because of the versatility of the presently invented ink coating composition, this composition is very well suited for use on coated optical glass fibers in ribbon assemblies. Surprisingly, ink coatings made according to the present invention are capable of providing mid-span access without the use of release agents. However, if desired release agents can be utilized to further enhance the releasability of the ink coating. Suitable release agents include silicones, silicone acrylates, fluorocarbon oils or resins and the like. Because the ink coatings according to the present invention inherently provide mid-span access, release agents can be added in significantly reduced amounts compared to conventional ink coatings. The release agent can be present in an amount of about 0.1 to about 20 wt. %, more preferably about 0.1 to about 10 wt. %, and most preferably about 0.1 to about 5 wt. %, based on the total weight of the ink composition.

Any inorganic and organic pigment that is suitable for making radiation-curable ink compositions can be used in the present invention. The use of the term "pigment" refers to both inorganic and organic pigments. Preferably, the pigment is utilized in the form of a pigment dispersion in order to simplify dispersion of the pigment within the ink coating composition. The pigment dispersion usually comprises one or more pigments dispersed in a low viscosity liquid, such as a reactive diluent, in such an amount that the pigment dispersion is easily pourable under ambient temperatures. For example, amounts of about 1 to about 80% by weight pigment dispersed in a reactive diluent have been found to be suitable. Pigment dispersions are well known and therefore one skilled in the art will be able to utilize well known pigment dispersions to formulate improved ink compositions according to the present invention based on the disclosure provided herein.

Ribbon assemblies utilizing 12 or less coated optical glass fibers require only 12 colors to adequately distinguish each of the coated optical fibers from one another. However, in larger ribbon assemblies, more than 12 colors may be utilized to adequately distinguish the coated optical glass fibers from one another. Examples of twelve colors normally used for making ribbon assemblies include: black, white, yellow, blue, red, green, orange, brown, pink, aqua, violet, and gray.

A specific example of a suitable black pigment includes carbon black.

A specific example of a suitable white pigment includes titanium dioxide.

Specific examples of suitable yellow pigments include diarylide yellow and diazo based pigments.

Specific examples of suitable blue pigments include phthalocyanine blue, basic dye pigments, and phthalocyanines.

Specific examples of suitable red pigments include anthraquinone (red), napthole red, monoazo based pigments, quinacridone pigments, anthraquinone, and perylenes.

Specific examples of suitable green pigments include phthalocyanine green and nitroso based pigments.

Specific examples of suitable orange pigments include monoazo and diazo based pigments, quinacridone pigments, anthraquinones and perylenes.

Specific examples of suitable violet pigments include quinacrinode violet, basic dye pigments and carbazole dioxazine based pigments.

Suitable aqua, brown, gray, and pink pigments can easily be formulated by combining other colors. One skilled in the art is able to form any color as desired by combining different.

The pigment can be present in the ink composition in an amount that provides coloration that is visible without magnification to facilitate identification of the individual colored optical glass fiber. The amount of the pigment should not be so great as to significantly reduce the cure speed of the ink composition or result in other undesirable affects. Examples of suitable amounts of pigment have been found to be from about 1 to about 20 weight %, preferably about 1 to about 15 weight %, more preferably about 1 to about 10 weight %, based on the total weight of the ink composition.

Based on the above, a suitable radiation-curable ink composition can be formulated from a composition containing:

from about 1 to about 20 weight % of at least one pigment;
from about 1 to about 90 weight % of adhesion adjusting oligomer.

A preferred ink composition can be formulated from a composition containing:

from about 1 to about 20 weight % of at least one pigment;
from about 1 to about 90 weight % of adhesion adjusting oligomer;
optionally from about 1 to about 80 weight % of other radiation-curable oligomers;
from about 1 to about 80 weight % of at least one radiation-curable diluent monomer.

Preferred amounts of other radiation-curable oligomers include from about 10 to about 70% by weight, more preferably, about 20 to about 60% by weight, based on the total weight of the ink composition.

Preferred amounts of the radiation-curable diluent monomer include from about 5 to about 70% by weight, more preferably, about 10 to about 60% by weight, based on the total weight of the ink composition.

Preferably, the ink composition contains a photoinitiator (s) in an amount of about 1 to about 20% by weight, more preferably about 1 to about 10% by weight, based on the total weight of the ink composition.

The ink coating composition can be applied to the coated optical glass and cured using any suitable method. An example of a suitable method is disclosed in U.S. Pat. No. 4,629,285, the complete disclosure of which is incorporated herein by reference. The ink composition can also be applied in a manner similar to the application of the outer primary coating on an optical glass fiber drawing and coating tower.

For applications where a colored outer primary coating is utilized in place of or in combination with an ink coating, such as when less than a concentric ink coating is applied, the adhesion adjusting oligomer can be incorporated into the colored outer primary coating to provide the desired level of adhesion between the colored outer primary coating and a matrix material. Based on the disclosure provided herein, one skilled in the art will be able to formulate the desired colored outer primary coating utilizing the adhesion adjusting oligomer. For example, since the radiation-curable base of outer primary coatings is similar to the radiation-curable carrier systems of ink coatings the adhesion adjusting oligomer can be incorporated into colored outer primary coating compositions using the amounts described herein in reference to the ink coating compositions. Thus, the adhesion properties of the outer primary coatings can be adjusted in the same manner as the ink coatings described herein by utilizing an adhesion adjusting oligomer. Conventional colored outer primary coatings can become the improved colored outer primary coatings according to this invention by incorporating an adhesion adjusting oligomer therein. Examples of suitable colored outer primary coatings are disclosed in published PCT application WO 90/13579, the complete disclosure of which is incorporated herein by reference. Alternatively, conventional outer primary coatings can become the improved colored outer primary coating according to the present invention by incorporating therein at least one pigment and an adhesion adjusting oligomer.

The adhesion adjusting oligomer is preferably present in an amount which provides the colored outer primary coating with a surface energy having a top contact angle (interface of outer primary coating with matrix material) of greater than 65°, more preferably about 70° and greater, and even more preferably about 75° and greater, and most preferably about 80° and greater, without the use of conventional silicone and fluorine containing compounds. If desired, conventional release agents, such as silicone and fluorine containing compounds can be incorporated into the colored outer primary coating composition in the same manner as in ink coating compositions.

The adhesion adjusting oligomer can also be incorporated into a radiation-curable matrix forming composition to provide releasability of the formed matrix material from an ink coating. Radiation-curable matrix forming compositions are based on radiation-curable monomers and oligomers which are similar to those used in the ink coating compositions described above. The proportions of the adhesion adjusting oligomer for formulating ink coating compositions described herein can be used for formulating improved matrix forming compositions according to the present invention. Thus, one skilled in the art will easily be able to form improved matrix forming compositions which are capable of providing matrix materials that will provide mid-span access when used in ribbon assemblies. Suitable matrix forming compositions that can be reformulated to include the adhesion adjusting oligomer are disclosed in U.S. Pat. No. 4,844,604, the complete disclosure of which is incorporated herein by reference. If desired, the matrix forming composition can contain one or more pigments to provide a colored matrix material. The amount of the pigment can be similar to those described herein with reference to the ink coating compositions.

The adhesion adjusting oligomer is preferably present in an amount which provides the matrix material with a surface energy having a top contact angle of greater than 65°, more preferably about 70° and greater, and even more preferably about 75° and greater, and most preferably about 80° and greater, without the use of conventional silicone and fluorine containing compounds. If desired, conventional release agents, such as silicone and fluorine containing compounds can be incorporated into the matrix material composition in the same manner as in ink coating compositions.

The adhesion adjusting oligomer can be utilized in either the ink coating or the matrix material, or both, in the ribbon assembly to tailor the adhesion properties of the ink coating and the matrix material as desired. Furthermore, when colored outer primary coatings are utilized in ribbon assemblies, the adhesion adjusting oligomer can be utilized in the colored outer primary coating, ink coating if present, and/or the matrix material to provide less adhesion between the colored outer primary coating and matrix material than between the colored outer primary and the underlying coating adjacent to the colored outer primary coating.

Ribbon assemblies are now well known in the art and one skilled in the art will easily be able to use the disclosure provided herein to prepare a novel ribbon assembly containing at least one of the improved ink coated optical glass fibers for the desired applications. The novel ribbon assembly made according to this invention can be used in telecommunication systems. Such telecommunication systems typically include ribbon assemblies containing optical glass fibers, transmitters, receivers, and switches. The ribbon assembly containing the coated optical glass fibers are the fundamental connecting units of telecommunication systems. The ribbon assembly can be buried under ground or water for long distance connections, such as between cities. The ribbon assembly can also be used to connect directly to residential homes.

The novel ribbon assembly made according to this invention can also be used in cable television systems. Such cable television systems typically include ribbon assemblies containing optical glass fibers, transmitters, receivers, and switches. The ribbon assembly containing the coated optical glass fibers are the fundamental connecting units of such cable television systems. The ribbon assembly can be buried under ground or water for long distance connections, such as between cities. The ribbon assembly can also be used to connect directly to residential homes.

The invention will be further explained by way of the following examples, without being limited thereto.

EXAMPLE 1–13 AND COMPARATIVE EXAMPLES A–M

The ability of the ink compositions to form ink coatings which exhibit mid-span access when utilized in a ribbon assembly, without using silicone or fluorocarbon release agents, was tested as follows. Base radiation-curable carrier compositions were first formed by combining the components shown in Table 1. Two of the base compositions contained an adhesion adjusting oligomer according to the present invention (B-1 and B-2).

Radiation-curable ink coating compositions were formed by combining the base compositions with pigments as shown in Tables 2 and 3. The ink coating compositions were tested to determine whether they were capable of providing mid-span access. The test results are shown in Tables 2 and 3.

TABLE 1

| Component (wt. % based on total weight of carrier system) | Base Carrier System B-1 | Base Carrier System B-2 | Base Carrier System B-3 | Base Carrier System B-4 |
| --- | --- | --- | --- | --- |
| Poly(12-Hydroxy Stearic Acid) Urethane Acrylate | 22.72 | 76.7 | 0 | 0 |
| Epoxy Acrylate | 20.84 | 0 | 38.6 | 38.8 |
| Hexafunctional Aromatic Urethane Acrylate | 9.17 | 0 | 0 | 0 |
| Aliphatic Urethane Triacrylate diluted 15% with Hexanediol Diacrylate | 10.56 | 0 | 32.4 | 22.75 |
| Pentaerythritol Tetracrylate | 11.59 | 0 | 10 | 11.31 |
| Hexanediol Diacrylate | 18.29 | 17.04 | 1.51 | 1.51 |
| Troysol 98C Surfactant (Troy) | 0.57 | 0 | 0 | 0 |
| 2,6-di-tert-Butyl-Methyl-Phenol | 0.57 | 0.57 | 0 | 0 |
| 2-benzyl-2-dimethylamino-1-(4-morpholinophenyl)-butan-1-one | 1.14 | 1.14 | 0 | 3.96 |
| 2-Methyl-1-(4-(Methylthio)Phenyl) 2-(4-Morpholinyl) 1-Propanone | 4.55 | 4.55 | 0 | 5.32 |
| Silicone Diacrylate | 0 | 0 | 1.21 | 1.21 |
| 50% Phosphine Oxide, Diphenyl (2,4,6-Trimethyl Benzoyl) and 50% 2-Hydroxy-2-Methyl-1-Phenyl-1-Propanone | 0 | 0 | 10 | 5 |
| Isobornyl Acrylate | 0 | 0 | 3 | 3.5 |
| Phenoxyethyl Acrylate | 0 | 0 | 3 | 3.5 |
| Hydroquinone Monomethylether | 0 | 0 | 0.14 | 0.14 |
| Phenothiazine | 0 | 0 | 0.14 | 0.14 |
| Ethyl-4-(dimethylamino)benzoate | 0 | 0 | 0 | 1.53 |
| 2-isopropylthioxanthone, and 4-isopropylthioxanthone | 0 | 0 | 0 | 1.53 |

TABLE 2

| Component (weight % based on total weight of composition) | Examp. 1 White | Examp. 2 Slate | Examp. 3 Blue | Examp. 4 Violet | Examp. 5 Yellow | Examp. 6 Rose | Examp. 7 Orange | Examp. 8 Green | Examp. 9 Brown | Examp. 10 Aqua | Examp. 11 Blue | Examp. 12 Red | Examp. 13 Orange |
|---|---|---|---|---|---|---|---|---|---|---|---|---|---|
| Base Carrier System B-1 | 86.37 | 88.5 | 88 | 83.77 | 79.8 | 83 | 82 | 85.5 | 82.15 | 84.68 | 0 | 0 | 0 |
| Base Carrier System B-2 | 0 | 0 | 0 | 0 | 0 | 0 | 0 | 0 | 0 | 0 | 88 | 78.14 | 82 |
| Pigment Dispersion | 13.63 | 11.5 | 12 | 16.23 | 20.2 | 17 | 18 | 14.5 | 17.85 | 15.32 | 12 | 21.86 | 18 |
| Test Results | | | | | | | | | | | | | |
| Mid-Span Access | Pass | Pass | Pass | Pass | Pass | Pass | Pass | Pass | Pass | Pass | Pass | Pass | Pass |
| Outer Primary Coating | P1 | P1 | P1 | P1 | P1 | P1 | P1 | P1 | P1 | P1 | P1 | P1 | P1 |
| Matrix Material | M1 | M1 | M1 | M1 | M1 | M1 | M1 | M1 | M1 | M1 | M1 | M1 | M1 |

TABLE 3

| Component (weight % based on total weight of composition) | Comp. Examp. A Red | Comp. Examp. B White | Comp. Examp. C Red | Comp. Examp. D Violet | Comp. Examp. E Yellow | Comp. Examp. F Rose | Comp. Examp. G Black | Comp. Examp. H Slate | Comp. Examp. I Orange | Comp. Examp. J Blue | Comp. Examp. K Green | Comp. Examp. L Brown | Comp. Examp. M Aqua |
|---|---|---|---|---|---|---|---|---|---|---|---|---|---|
| Carrier System B-1 | 78.14 | 0 | 0 | 0 | 0 | 0 | 0 | 0 | 0 | 0 | 0 | 0 | 0 |
| Base Carrier System B-3 | 0 | 86.37 | 0 | 0 | 0 | 0 | 0 | 0 | 0 | 88 | 0 | 0 | 84.68 |
| Base Carrier System B-4 | 0 | 0 | 78.14 | 83.77 | 79.8 | 83 | 89.5 | 88.5 | 82 | 0 | 85.5 | 82.15 | 0 |
| Pigment Dispersion | 21.86 | 13.63 | 21.86 | 16.23 | 20.2 | 17 | 10.5 | 11.5 | 18 | 12 | 14.5 | 17.85 | 15.32 |
| Test Results | | | | | | | | | | | | | |
| Mid-Span Access | Fail | Fail | Fail | Fail | Fail | Fail | Fail | Fail | Fail | Fail | Fail | Fail | Fail |
| Outer Primary Coating | P1 | P1 | P1 | P1 | P1 | P1 | P1 | P1 | P1 | P1 | P1 | P1 | P1 |
| Matrix Material | M1 | M1 | M1 | M1 | M1 | M1 | M1 | M1 | M1 | M1 | M1 | M1 | M1 |

The results shown in Table 2 demonstrate that the adhesion adjusting oligomer according to the present invention is capable of providing ink coatings having the inherent property of mid-span access without the use of conventional release agents.

The ink coating compositions used in Table 3 were applied and cured in less than four hours time from formulation of the ink coating composition. It was later discovered that some ink composition provided the inherent property of mid-span access only when allowed to rest for at least four hours after formulation and before curing, as can be seen from the test results described below in Table 5. Therefore, it is believed that the ink compositions utilized in Table 3 may have provided the inherent property of providing mid-span access if allowed to rest for at least 4 hours before curing. In commercial applications, ink compositions are usually allowed to rest for periods of time significantly greater than four hours, because the ink coating formulations are generally sold in a form ready for application and curing.

Matrix Materials M1–M6

The effect of different matrix materials on mid-span access was tested as follows. Radiation-curable matrix forming compositions were formed by combining the components shown in Table 5.

The ability of the matrix material to provide mid-span access was tested in the same manner as Example 1 using the ink compositions shown in Table 4. The test results are shown in Table 5.

TABLE 4

| Component (% by weight of total composition) | Ink Comp. IN-1 | Ink Comp. IN-2 | Ink Comp. IN-3 |
|---|---|---|---|
| Epoxy Acrylate | 23.52 | 18.82 | 20.22 |
| Hexafunctional Aromatic Urethane Acrylate | 13.23 | 10.58 | 0 |
| Aliphatic Urethane Triacrylate diluted 15% with Hexanediol Diacrylate | 23.43 | 18.74 | 20.14 |
| Pentaerythritol Tetracrylate | 16.72 | 13.38 | 14.37 |
| Hexanediol Diacrylate | 5.1 | 4.08 | 4.38 |
| Trysol 98C Surfactant (Troy) | 0.5 | 0.4 | 0.5 |
| 2,6-di-tert-Butyl-Methyl-Phenol | 0.5 | 0.4 | 0 |
| 2-benzyl-2-dimethylamino-1-(4-morpholinophenyl)-butan-1-one | 1 | 0.8 | 0 |
| 1-Propanone,2-Methyl-1-1-(4-(Methylthio)Phenyl)2-(4-Morpholinyl) | 4 | 3.2 | 0 |
| Pigment Dispersion | 12 | 9.6 | 11.95 |
| Poly(12-hydroxysteanc acid) acrylate | 0 | 20 | 0 |
| Multifunctionai Aromatic Urethane Acrylate in an Acrylated Polyol Diluent | 0 | 0 | 11.38 |
| Silicone Diacrylate | 0 | 0 | 1.31 |
| 50% Phosphine Oxide, Diphenyl (2,4,6-Trimethyl Benzoyl) and 50% 2-Hydroxy-2-Methyl-1-Phenyl-1-Propanone | 0 | 0 | 13.08 |
| 1-Hydroxycyclohexyl Phenyl ketone | 0 | 0 | 2.63 |
| Phenothiazine | 0 | 0 | 0.03 |
| Hydroquinone Monomethylether | 0 | 0 | 0.03 |

TABLE 5

| Component (weight % based on total weight of composition) | M1 | M2 | M3 | M4 | M5 | M6 |
|---|---|---|---|---|---|---|
| Oligomer H-T-(Pluracol2010)$_{0.9}$-(SynFAC8017)$_{1.4}$T-H | 55 | 61.1 | 68.24 | 55 | 55 | 0 |
| Isobornyl Acrylate | 3.9 | 4.3 | 0 | 5 | 3.9 | 0 |
| Propoxylated Hexanediol Diacrylate | 3.9 | 4.3 | 0 | 5 | 3.9 | 0 |
| Ethoxylated Bisphenol A Diacrylate | 23 | 25.5 | 11 | 29.7 | 23 | 0 |
| 1-Hydroxycyclohexyl Phenyl Ketone | 4 | 4.4 | 3 | 4 | 4 | 0 |
| Thiodiethylene bis(3,5-di-tert-butyl-4-hydroxy hydrocinnamate) | .3 | 0.4 | 0.3 | 0.3 | .3 | 1 |
| Epoxidized Soybean Oil Acrylate | 10 | 0 | 0 | 0 | 0 | 0 |
| Polyethylene Glycol (Carbowax PEG300) | 0 | 0 | 0 | 0 | 10 | 0 |
| Vinyl Caprolactam | 0 | 0 | 10 | 0 | 0 | 0 |
| Phenoxy Ethyl Acrylate | 0 | 0 | 6.46 | 0 | 0 | 0 |
| Dimethyl Polysiloxane | 0 | 0 | 0.3 | 0.3 | 0 | 0.4 |
| Dimethyl Polysiloxane (surfactant) | 0 | 0 | 0.7 | 0.7 | 0 | 0.6 |
| Epoxy Acrylate cut 20% in Tripropylene Glycol Diacrylate | 0 | 0 | 0 | 0 | 0 | 68.75 |
| Tripropylene Glycol Diacrylate | 0 | 0 | 0 | 0 | 0 | 26.25 |
| 2-Hydroxy 2-Methyl 1-Phenyl 1-Propanone | 0 | 0 | 0 | 0 | 0 | 3 |
| Test Results | | | | | | |
| Outer Primary Coating | P1 | P1 | P1 | P1 | P1 | P1 |
| Mid-Span Access (no delay after formulating ink composition IN-1) | Fail | Fail | Fail | ND | Fail | ND |
| Mid-Span Access (no time delay after formulating ink composition IN-2) | Fail | ND | Fail | ND | Fail | ND |
| Mid-Span Access (within 1 hour after formulating ink composition IN-2) | Fail | Fail | Fail | Fail | Fail | Fail |
| Mid-Span Access (4 hours after formulating ink composition IN-2) | Pass | Pass | Pass | Pass | Pass | Fail |
| Mid-Span Access (no delay after formulating ink composition IN-3) | Pass | ND | Pass | ND | Pass | ND |

ND = Not Determinable
The Oligomer was formed by reacting the following components:
H = Hydroxyethyl Acrylate
T = Toluene Diisocyanate
Pluracol 2010 = polyoxypropyleneglycol diol having a molecular weight of about 2000 (BASF)
SynFAC8017 = ethoxylated bisphenol A diol (Milliken)

The results in Table 5 demonstrate that the use of the adhesion adjusting oligomer in an ink composition provides the ink coating with the inherent ability of mid-span access, even without the use of release agents.

EXAMPLES 14–15 AND COMPARATIVE EXAMPLES N–R

The effects of different additives in the matrix material on the capability of the matrix material for providing mid-span access was tested as follows. The additives shown in Table 6 were combined with a radiation-curable matrix forming material. The capability of providing mid-span access was determined in the same manner as Example 1 and the test results are shown in Table 6.

TABLE 6

| Component (weight % based on total weight of composition) | Examp. 14 | Examp. 15 | Comp. Examp. N | Comp. Examp. O | Comp. Examp. P | Comp. Examp. Q | Comp. Examp. R |
|---|---|---|---|---|---|---|---|
| Matrix Composition M4 | 90 | 90 | 90 | 90 | 90 | 90 | 90 |
| Kemester 6000 | 10 | 0 | 0 | 0 | 0 | 0 | 0 |
| Epoxidized Soybean Oil Acrylate | 0 | 10 | 0 | 0 | 0 | 0 | 0 |
| Softisan 100 | 0 | 0 | 10 | 0 | 0 | 0 | 0 |
| 6% Iron Hex-com | 0 | 0 | 0 | 10 | 0 | 0 | 0 |
| Zelect NE | 0 | 0 | 0 | 0 | 10 | 0 | 0 |
| Aluminum Stearate | 0 | 0 | 0 | 0 | 0 | 10 | 0 |
| Zinc Stearate | 0 | 0 | 0 | 0 | 0 | 0 | 10 |
| Test Results | | | | | | | |
| Outer Primary Coating | P1 | P1 | P1 | P1 | P1 | P1 | P1 |
| Ink Coating Composition | IN-1 | IN-1 | IN-1 | IN-1 | IN-1 | IN-1 | IN-1 |
| Mid-Span Access (no delay after IN-1) | Pass | Pass | Fail | Fail | Fail | Fail | Fail |

EXAMPLES 16–17 AND COMPARATIVE EXAMPLES S–HH

An adhesion adjusting oligomer was added to an ink composition using the component shown in Table 7. Comparative ink coating compositions were formed by combining conventional additives with the ink composition as shown in Tables 7 and 8. The capability of the ink composition to provide mid-span access without using fluorine and silicone containing release agents was tested in the same manner as Example 1. The test results are shown in tables 7 and 8.

TABLE 7

| Component (weight % based on total weight of composition) | Examp. 16 | Examp. 17 | Comp. Examp. S | Comp. Examp. T | Comp. Examp. U | Comp. Examp. V | Comp. Examp. W |
|---|---|---|---|---|---|---|---|
| Ink Composition IN-1 | 80 | 80 | 80 | 80 | 80 | 80 | 80 |
| Polyethylenebutylene Acrylate | 20 | 0 | 0 | 0 | 0 | 0 | 0 |
| Emsorb 2503 | 0 | 0 | 20 | 0 | 0 | 0 | 0 |
| Emsorb 2500 | 0 | 0 | 0 | 20 | 0 | 0 | 0 |
| Cardolite NC-57366 | 0 | 0 | 0 | 0 | 20 | 0 | 0 |
| Cardolite NC-547 | 0 | 20 | 0 | 0 | 0 | 0 | 0 |
| Photomer 4200 | 0 | 0 | 0 | 0 | 0 | 20 | 0 |
| RCC 13-429 Polyester Acrylate (Henkel) | 0 | 0 | 0 | 0 | 0 | 0 | 20 |
| Test Results | | | | | | | |
| Outer Primary Coating | P1 | P1 | P1 | P1 | P1 | P1 | P1 |
| Matrix Material | M1 | M1 | M1 | M1 | M1 | M1 | M1 |
| Mid-Span Access (no delay after formulating ink composition IN-1) | Pass | Pass | Fail | Fail | Fail | Fail | Fail |

TABLE 8

| Component (weight % based on total weight of composition | Comp. Examp. X | Comp. Examp. Y | Comp. Examp. Z | Comp. Examp. AA | Comp. Examp. BB | Comp. Examp. CC | Comp. Examp. DD | Comp. Examp. EE | Comp. Examp. FF | Comp. Examp. GG | Comp. Examp. HH |
|---|---|---|---|---|---|---|---|---|---|---|---|
| Ink Composition IN-1 | 90 | 90 | 90 | 90 | 90 | 90 | 90 | 90 | 90 | 90 | 90 |
| Linoleic Acid | 10 | 0 | 0 | 0 | 0 | 0 | 0 | 0 | 0 | 0 | 0 |
| Linseed Oil | 0 | 10 | 0 | 0 | 0 | 0 | 0 | 0 | 0 | 0 | 0 |
| Soybean Oil | 0 | 0 | 10 | 0 | 0 | 0 | 0 | 0 | 0 | 0 | 0 |
| Photomer 4818 | 0 | 0 | 0 | 10 | 0 | 0 | 0 | 0 | 0 | 0 | 0 |
| Photomer 4812 | 0 | 0 | 0 | 0 | 10 | 0 | 0 | 0 | 0 | 0 | 0 |
| Lanolin Oil | 0 | 0 | 0 | 0 | 0 | 10 | 0 | 0 | 0 | 0 | 0 |
| Cetearyl Alcohol and Polysorbate 60 | 0 | 0 | 0 | 0 | 0 | 0 | 10 | 0 | 0 | 0 | 0 |
| Cetearyl Alcohol Steareth 20 | 0 | 0 | 0 | 0 | 0 | 0 | 0 | 10 | 0 | 0 | 0 |
| Hydroxylated Lanolin | 0 | 0 | 0 | 0 | 0 | 0 | 0 | 0 | 10 | 0 | 0 |
| Dimethicone Copolymer | 0 | 0 | 0 | 0 | 0 | 0 | 0 | 0 | 0 | 10 | 0 |
| Cocamidopropyl Betaine | 0 | 0 | 0 | 0 | 0 | 0 | 0 | 0 | 0 | 0 | 10 |
| Test Results | | | | | | | | | | | |
| Outer Primary Coating | P1 | P1 | P1 | P1 | P1 | P1 | P1 | P1 | P1 | P1 | P1 |
| Matrix Material | M1 | M1 | M1 | M1 | M1 | M1 | M1 | M1 | M1 | M1 | M1 |
| Mid-Span Access (no delay after formulating ink composition IN-6) | Fail | Fail | Fail | Fail | Fail | Fail | Fail | Fail | Fail | Fail | Fail |

The results in table 7 demonstrate that the adhesion adjusting oligomer according to the present invention is surprisingly capable of providing the ink coating with the inherent ability of mid-span access without the use of silicone and fluorine containing release agents.

COMPATIBILITY EXAMPLES

The compatibility of the desired adhesion adjusting oligomer in the radiation-curable carrier can be easily determined as follows. The adhesion adjusting oligomer can be combined with different monomers and oligomers to determine the compatibility of the adhesion adjusting oligomer therewith. Those combinations that provide a clear mixture signify that the adhesion adjusting oligomer is compatible with the monomer or oligomer. By formulating the ink composition from compatible monomers, the ink composition can retain a long shelf life without having the components separating. The monomers and oligomers can be selected to provide the desired properties in the cured coating.

The compatibility of poly(12-hydroxystearic acid) acrylate with 16 commercially available monomers and oligomers was tested by combining equal parts by weight of each monomer or oligomer and poly(12-hydroxystearic acid) acrylate, as shown in Table 9. A hazy appearance signifies an incompatible mixture. By using compatible monomers and oligomers, a compatible radiation-curable carrier system can be formulated.

TABLE 9

| Component | Appearance |
| --- | --- |
| Bisphenol A Ethoxylated Diacrylate | Hazy |
| Isobornyl Acrylate | Clear |
| Hexanediol Diacrylate | Clear |
| Trimethylol Propane Triacrylate | Hazy |
| Ethoxylated Trimethylol Propane Triacrylate | Hazy |
| Glycerylpropoxy Triacrylate | Hazy |
| Phenoxyethyl Acrylate | Clear |
| Tripropylene GIycol Diacrylate | Clear |
| Ethoxylated Nonylphenol Acrylate | Clear |
| Propoxylated Nonylphenol Acrylate | Clear |
| Isodecyl Acrylate | Clear |
| Tris(2-hydroxyethyl)isocyanurate Triacrylate | Hazy |
| Lauryl Acrylate | Clear |
| Stearyl Acrylate | Hazy |
| Propoxylated Neopentylglycol Diacrylate | Clear |

SURFACE ENERGY EXAMPLES AND COMPARATIVE EXAMPLES

The surface energy of base radiation-curable carrier systems for ink coatings formed according to the present invention and conventional ink coatings was measured. The test results are shown in Table 10.

TABLE 10

| Sample | Average Contact Angle Top (°) |
| --- | --- |
| Base Carrier System B2 (76.7 wt. % 12HSA) | 80 +/− 2 |
| Base Carrier System B1 (22.72 wt. % 12HSA) | 78 +/− 2 |
| Base Carrier System B1 (without 12HSA) | 65 +/− 2 |
| Base Carrier for Commercially Available Ink (Silicone Removed) | 62 +/− 1 |

The results in Table 10 demonstrate that the present invention is surprisingly capable of substantially reducing the surface energy of the ink coating without the use of silicone or fluorine release agents. The larger the contact angle the lower the surface energy.

TEST PROCEDURES

Mid-Span Access

A 75 micron thick drawdown of a commercially available, radiation-curable outer primary coating composition was applied to a Mylar sheet and cured by exposure to 1 Joule/cm$^2$ of UV light from a Fusion D lamp under a nitrogen atmosphere to form a cured outer primary film. A 5 to 10 micron thick drawdown of the sample radiation-curable ink composition was formed on the cured outer primary film. The ink-composition was cured by exposure to 1 Joule/cm$^2$ of UV light from a Fusion D lamp in air to form a cured ink coating. A 75 micron thick drawdown of a commercially available radiation-curable matrix composition was formed on the ink coating. The matrix composition was cured by exposure to 1 Joule/cm$^2$ of UV light from a Fusion D lamp under a nitrogen atmosphere to form a cured matrix material on the ink coating.

Strips of the formed multilayer film were cut having a width of from about ¼ to about ½ inch. At one end of each strip, a portion of the matrix material was separated from the ink coating using a knife. Force was applied to the separated portion of the matrix material to attempt to peel the remaining matrix material from the ink coating. If the remaining matrix material separated cleanly from the ink coating, wherein the ink coating remained intact and the matrix material did not break apart, the ink coating passed the mid-span access test.

Surface Energy

Contact angle measurements were carried out by the sessile drop method using a Rame-Hart contact angle goniometer. Distilled water was used as the test liquid. The liquid drops (4–8 μl) were placed on the sample surface using a Gilmont micrometer syringe fitted with a stainless steel needle. Contact angles were measured after one minute. The contact angle on both sides of the drop were measure to assure symmetry. For each sample contact angle, measurements were made on two different films. Five measurements were made on each film. A total of ten drops were used for each sample. The results were averaged and the standard deviation calculated. In each case, the advancing contact angle was measured.

The top contact angle of the air/ink interface of the films was measured. The air/ink interface represents the surface where the matrix material is usually applied to the ink coating.

The sample ink films were prepared by drawing down a clear ink base on mylar using a 3 mil bird bar. The drawdowns were cured in $N_2$ using a D lamp at 2 Jcm$^{-2}$. The top and bottom of each sample was cured. Portions of film were peeled off the mylar and mounted onto microscope slides for measurement.

The matrix films were prepared in the same way, except that they were cured at 1 Jcm$^{-2}$, top only.

The larger the contact angle the lower the surface energy of the tested surface. Thus, by comparing contact angles of different surfaces, the relative surface energies can be determined.

While the claimed invention has been described in detail and with reference to specific embodiments thereof, it will be apparent to one of ordinary skill in the art that various changes and modifications can be made to the claimed invention without departing from the spirit and scope thereof.

We claim:

1. An optical glass fiber ribbon assembly having the functional capability of providing mid-span access to individual coated optical glass fibers, said ribbon assembly comprising:

a plurality of coated optical glass fibers; and a matrix material which binds said plurality of coated optical glass fibers together, wherein at least one of said coated optical glass fibers contains an ink coating or colored outer primary coating formulated from a radiation-curable composition comprising:

an adhesion adjusting oligomer having at least one radiation-curable functional group bound to a low surface energy backbone and being substantially free-of silicone and fluorine, said adhesion adjusting oligomer being present in an amount which reduces the surface energy of said ink coating or said colored outer primary coating to a level that provides less adhesion between said ink coating or said colored outer primary coating and said matrix material than between said ink coating or said colored primary coating and a coating on said optical glass fiber adjacent to said ink coating or said colored outer primary coating.

2. A ribbon assembly according to claim 1, wherein said adhesion adjusting oligomer comprises at least one represented by the following formulae in which the listed components are reacted:

$$P—(BHCA)_m—I—R \quad (2);$$

$$P—((BHCA)_m—A—(BHCA)_m—I)_n—R \quad (3);$$

and $$R—I—((BHCA)_m—A—(BHCA)_m—I)_n—R \quad (4),$$

wherein BHCA is a hydroxy carboxylic acid which is branched and/or which contains a non-terminal hydroxy functional group that provides a hydrocarbon side chain bound to the polyester backbone upon reaction of the hydroxy functional group to form an ester group;

I is a polyisocyanate compound;

A is a polyol;

P is compound containing at least one hydroxy functional group;

R is a hydroxy functional compound containing a radiation-curable functional group;

n is from 1 to about 20 on average; and m is from 1 to about 50 on average.

3. A ribbon assembly according to claim 1, wherein said adhesion adjusting oligomer comprises at least one represented by the following formula in which the listed components are reacted:

$$R—I—((BHCA)_S—A—(BHCA)_V—I)_W—R \quad (7)$$

wherein R=a hydroxy functional, radiation- curable compound:

I=a polyisocyanate compound:

BHCA=a hydroxy carboxylic acid which is branched and/or which contains a non-terminal hydroxy functional group that provides a carbon-containing side chain bound to the polyester backbone upon reaction of the hydroxy functional group to form an ester group;

A=a polyol;

W=1 to about 20 on average; and

S+V=4 to about 20 on average.

4. A ribbon assembly according to a claim 3, wherein BHCA comprises poly(12-hydroxystearic acid) and A comprises a diol represented by the following formula:

$$HO—\underset{\underset{H}{|}}{\overset{\overset{H}{|}}{C}}—\underset{\underset{R_{12}}{|}}{\overset{\overset{R_{11}}{|}}{C}}—\underset{\underset{H}{|}}{\overset{\overset{H}{|}}{C}}—OH \quad (6)$$

Where H=a hydrogen atom;

O=an oxygen atom;

C=is a carbon atom; and $R_{11}$, and $R_{12}$=are each H or hydrocarbon side chains having from 1 to 12 carbon atoms, with the proviso that $R_{11}$ and $R_{12}$ are not both H.

5. A ribbon assembly according to claim 1, wherein said adhesion adjusting oligomer comprises at least one represented by the following formula in which the listed components are reacted:

$$HA—I—Poly(HSA)—I—HA \quad (8)$$

wherein HA=hydroxyethyl acrylate,

I=isophorone diisocyanate; and

Poly(HSA) is represented by the following formula (9)

$$HO—(\underset{\underset{}{}}{\overset{\overset{CH_3\text{-}(CH_2)_5}{|}}{CH}}—(CH_2)_{10}\text{-}CO_2)_B—CH_2—\underset{\underset{C_4H_9}{|}}{\overset{\overset{C_2H_5}{|}}{C}}—CH_2\text{-}(O_2C—(CH_2)_{10}—\underset{\underset{(CH_2)_5\text{-}CH_3}{|}}{\overset{\overset{}{}}{CH}})_C—OH \quad (9)$$

wherein B+C=2 to about 20 on average.

6. A ribbon assembly according to claim 5, wherein B+C is about 5 to about 15 on average.

7. A ribbon assembly according to claim 1, wherein said adhesion adjusting oligomer comprises at least one represented by the following formulae in which the listed components are reacted:

$$R—I—(A—(PAC—A)_t)—I—R \quad (10);$$

$$R—(PAC—A)_t—I—R \quad (11);$$

and $$R—(PAC—(A—PAC)_t)—R \quad (12),$$

wherein PAC is a polycarboxylic compound;

I=a polyisocyanate compound;

R=a hydroxy functional radiation-curable compound;

A=a polyol; and t=1 to about 20 on average, and wherein at least one of the polycarboxylic acid or the polyol is branched to provide a polyester backbone having carbon-containing side chains, or the polyol contains a non-terminal hydroxy functional group which provides a polyester backbone having carbon-containing side chains upon reaction of the hydroxy-functional group with a carboxylic acid to form an ester functional group.

8. A ribbon assembly according to claim 1, wherein said ink coating has a surface energy that provides an average top contact angle of greater than 65°.

9. A ribbon assembly according to claim 1, wherein said ink coating has a surface energy that provides an average top contact angle of at least about 70°.

10. A ribbon assembly according to claim 1, wherein said ink coating has a surface energy that provides an average top contact angle of at least about 75°.

11. A ribbon assembly according to claim 1, wherein said ink coating has a surface energy that provides an average top contact angle of at least about 80°.

12. A ribbon assembly according to claim 1, wherein said adhesion adjusting oligomer comprises at least one radiation-curable functional group bound to a hydrocarbon backbone.

13. A ribbon assembly according to claim 1, wherein said adhesion adjusting oligomer comprises at least one radiation-curable functional group bound to a hydrocarbon backbone comprising a homopolymer or copolymer of ethylene, butylene or propylene.

14. A ribbon assembly according to claim 1, wherein said ink coating composition has been cured in the presence of air.

15. A ribbon assembly according to claim 1, wherein said ink coating composition has been cured in an inert atmosphere.

16. A ribbon assembly according to claim 1, wherein said adhesion adjusting oligomer is present in an amount of about 1 to about 90% by weight based on the total weight of said radiation-curable composition.

17. A ribbon assembly according to claim 1, wherein said adhesion adjusting oligomer has a number average molecular weight of from 1,000 to 8,000 and from 5% to 40% of the number average molecular weight of the adhesion adjusting oligomer.

18. A ribbon assembly according to claim 17, wherein at least 10% of the number average molecular weight of said adhesion adjusting oligomer is comprised of hydrocarbon side-chains.

19. A ribbon assembly according to claim 17, wherein at least 15% of the number average molecular weight of said adhesion adjusting oligomer is comprised of hydrocarbon side-chains.

20. A ribbon assembly according to claim 17, wherein less than 20% of the number average molecular weight of said adhesion adjusting oligomer is comprised of hydrocarbon side-chains.

21. A ribbon assembly according to claim 17, wherein less than 30% of the number average molecular weight of said adhesion adjusting oligomer is comprised of hydrocarbon side-chains.

22. A ribbon assembly according to claim 17, wherein said hydrocarbon side-chains comprise lower alkyls or alkyl substituted aryls having from 3 to 30 carbon atoms.

23. A ribbon assembly according to claim 17, wherein said hydrocarbon side-chains comprise lower alkyls or alkyl substituted aryls having from 5 to 20 carbon atoms.

24. A ribbon assembly according to claim 17, wherein said hydrocarbon side-chains are spaced out along said backbone in a comb-like structure.

25. A ribbon assembly according to claim 1, wherein said ink coating contains at least one release agent selected from the group consisting of silicones, silicone acrylates, fluorocarbon-oils, and fluorocarbon resins.

26. A ribbon assembly according to claim 1, wherein said matrix material is formulated from a matrix forming composition containing at least one adhesion adjusting oligomer.

27. An optical glass fiber ribbon assembly having the functional capability of providing mid-span access to individual coated optical glass fibers, said ribbon assembly comprising:
a plurality of coated optical glass fibers; and
a matrix material which binds said plurality of coated optical glass fibers together, wherein at least one of said coated optical glass fibers comprises:
an optical glass fiber;
at least one coating on said optical glass fiber;
a colored outer primary coating on said at least one coating formulated from a composition comprising:
an adhesion adjusting oligomer having at least one radiation-curable functional group bound to a low surface energy backbone and being substantially free-of silicone and fluorine, said adhesion adjusting oligomer being present in an amount which reduces the surface energy of said colored outer primary coating to a level that provides less adhesion between said colored outer primary coating and said matrix material than between said colored outer primary coating and said at least one coating on said optical glass fiber.

28. A ribbon assembly according to claim 27, wherein said adhesion adjusting oligomer comprises at least one represented by the following formulae in which the listed components are reacted:

  (2);

  (3);

and

  (4), wherein BHCA is a hydroxy carboxylic acid which is branched and/or which contains a non-terminal hydroxy functional group that provides a hydrocarbon side chain bound to the polyester backbone upon reaction of the hydroxy functional group to form an ester group;
I is a polyisocyanate compound;
A is a polyol;
P is compound containing at least one hydroxy functional group;
R is a hydroxy functional compound containing at radiation-curable functional group;
n is from 1 to about 20 on average; and
m is from 1 to about 50 on average.

29. A ribbon assembly according to claim 27, wherein said adhesion adjusting oligomer comprises at least one represented by the following formula in which the listed components are reacted:

  (7)

wherein R=a hydroxy functional, radiation- curable compound:
I=a polyisocyanate compound:
BHCA=a hydroxy carboxylic acid which is branched and/or which contains a non-terminal hydroxy functional group that provides a carbon-containing side chain bound to the polyester backbone upon reaction of the hydroxy functional group to form an ester group;
A=a polyol;
W=1 to about 20 on average; and
S+V=4 to about 20 on average.

30. A ribbon assembly according to a claim 29, wherein BHCA comprises poly(12hydroxystearic acid) and A comprises a diol represented by the following formula:

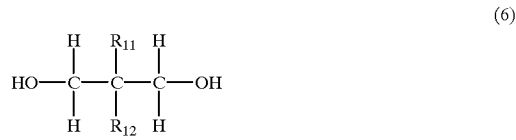  (6)

Where H=a hydrogen atom;
O=an oxygen atom;
C=is a carbon atom; and
$R_{11}$ and $R_{12}$=are each H or hydrocarbon side chains having from 1 to 12 carbon atoms, with the proviso that $R_{11}$ and $R_{12}$ are not both H.

31. A ribbon assembly according to claim 27, wherein said adhesion adjusting oligomer comprises at least one represented by the following formula in which the listed components are reacted:

HA-I-Poly(HSA)-I-HA (8)

wherein HA=hydroxyethyl acrylate,
I=isophorone diisocyanate; and
Poly(HSA) is represented by the following formula (9)

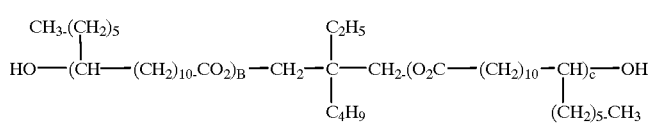

(9)

wherein B+C=2 to about 20 on average.

32. A ribbon assembly according to claim 31, wherein B+C is about 5 to about 15 on average.

33. A ribbon assembly according to claim 27, wherein said adhesion adjusting oligomer comprises at least one represented by the following formulae in which the listed components are reacted:

R-I-(A-(PAC-A)$_t$)-I-R (10);
R-(PAC-A)$_t$-I-R (11)
R-(PAC-(A-PAC)$_t$)-R (12), wherein PAC is a polycarboxylic compound;
I=a polyisocyanate compound;
R=a hydroxy functional radiation-curable compound;
t=1 to about 20 on average, and wherein at least one of the polycarboxylic acid or the polyol is branched to provide a polyester backbone having carbon-containing side chains, or the polyol contains a non-terminal hydroxy functional group which provides a ployester backbone having carbon-containing side chains upon reaction of the hydroxy-functional group with a carboxylic acid to form an ester functional group.

34. A ribbon assembly according to claim 27, wherein said colored outer primary coating has a surface energy that provides an average top contract angle of greater than 65°.

35. A ribbon assembly according to claim 27, wherein said colored outer primary coating has a surface energy that provides an average top contact angle of at least about 70°.

36. A ribbon assembly according to claim 27, wherein said colored outer primary coating has a surface energy that provides an average top contact angle of at least about 75°.

37. A ribbon assembly according to claim 27, wherein said colored outer primary coating has a surface energy that provides an average top contact angle of at least about 80°.

38. A ribbon assembly according to claim 27, wherein said adhesion adjusting oligomer comprises at least one radiation-curable functional group bound to a hydrocarbon backbone.

39. A ribbon assembly according to claim 27, wherein said adhesion adjusting oligomer comprises at least one radiation-curable functional group bound to a hydrocarbon backbone comprising a homopolymer or copolymer of ethylene, butylene or propylene.

40. A ribbon assembly according to claim 27, wherein said colored outer primary coating composition has been cured in the presence of air.

41. A ribbon assembly according to claim 27, wherein said colored outer primary coating compostion has been cured in an inert atmosphere.

42. A ribbon assembly according to claim 27, wherein said adhesion adjusting oligomer is present in an amount of about 1 to about 90% by weight based on the total weight of said radiation-curable composition.

43. A ribbon assembly according to claim 27, wherein said adhesion adjusting oligomer has a number average molecular weight of from 1,000 to 8,000 and from 5% to 40% of the number average molecular weight of the adhesion adjusting oligomer.

44. A ribbon assembly according to claim 43, wherein at least 10% of the number average molecular weight of said adhesion adjusting oligomer is comprised of hydrocarbon side-chains.

45. A ribbon assembly according to claim 43, wherein at least 15% of the number average molecular weight of said adhesion adjusting oligomer is comprised of hydrocarbon side-chains.

46. A ribbon assembly according to claim 43, wherein less than 20% of the number average molecular weight of said adhesion adjusting oligomer is comprised of hydrocarbon side-chains.

47. A ribbon assembly according to claim 43, wherein less than 30% of the number average molecular weight of said adhesion asjusting oligomer is comprised of hydrocarbon side-chains.

48. A ribbon assembly according to claim 43, wherein said hydrocarbon side-chains comprise lower alkyls or alkyl substituted aryls having from 3 to 30 carbon atoms.

49. A ribbon assembly according to claim 43, wherein said hydrocarbon side-chains comprise lower alkyls or alkyl substituted aryls having from 5 to 20 carbon atoms.

50. A ribbon assembly according to claim 43, wherein said hydrocarbon side-chains are spaced out along said backbone in a comb-like structure.

51. A ribbon assembly according to claim 27, wherein said colored outer primary coating contains at least one release agent selected from the group consisting of silicones, silicone acrylates, fluorocarbon-oils, and fluorocarbon resins.

52. A ribbon assembly according to claim 27, wherein said matrix material is formulated from a matrix forming composition containing at least one adhesion adjusting oligomer.

* * * * *